United States Patent
Sawano et al.

(10) Patent No.: US 8,510,115 B2
(45) Date of Patent: Aug. 13, 2013

(54) DATA PROCESSING WITH AUTOMATIC SWITCHING BACK AND FORTH FROM DEFAULT VOICE COMMANDS TO MANUAL COMMANDS UPON DETERMINATION THAT SUBSEQUENT INPUT INVOLVES VOICE-INPUT-PROHIBITED INFORMATION

(75) Inventors: Yasuaki Sawano, Kawasaki (JP); Toshio Yoshihara, Kawasaki (JP); Yuuichi Hagiwara, Ohta-ku (JP); Ryotaro Imine, Kawasaki (JP); Shozo Yamasaki, Yokohama (JP); Kota Kato, Meguro-ku (JP); Makoto Kikugawa, Ohta-ku (JP); Eiji Ohara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1378 days.

(21) Appl. No.: 11/465,891

(22) Filed: Aug. 21, 2006

(65) Prior Publication Data

US 2007/0061150 A1 Mar. 15, 2007

(30) Foreign Application Priority Data

Sep. 13, 2005 (JP) ................. 2005-265905

(51) Int. Cl.
- *G10L 21/00* (2013.01)
- *G10L 11/00* (2006.01)
- *G10L 15/26* (2006.01)
- *G10L 17/00* (2013.01)
- *G10L 13/04* (2013.01)

(52) U.S. Cl.
CPC ............. *G10L 15/265* (2013.01); *G10L 13/043* (2013.01); *G10L 17/005* (2013.01)
USPC ........................... 704/275; 704/273; 704/272

(58) Field of Classification Search
CPC ..... G10L 15/265; G10L 15/22; G10L 13/043; G10L 17/005; G06F 3/16
USPC .................................. 704/275, 273; 399/81
See application file for complete search history.

(56) References Cited

U.S. PATENT DOCUMENTS

| | | | | |
|---|---|---|---|---|
| 5,086,385 | A  * | 2/1992 | Launey et al. | 700/83 |
| 6,253,184 | B1 * | 6/2001 | Ruppert | 704/275 |
| 6,842,593 | B2 * | 1/2005 | Cannon | 399/81 |
| 7,280,970 | B2 * | 10/2007 | Tamir et al. | 704/273 |
| 7,383,189 | B2 * | 6/2008 | Halonen et al. | 704/275 |
| 2005/0065778 | A1 * | 3/2005 | Mastrianni et al. | 704/200.1 |

FOREIGN PATENT DOCUMENTS

| | | |
|---|---|---|
| JP | H07-025411 U | 5/1995 |
| JP | H10-111728 A | 4/1998 |
| JP | 2000-181292 A | 6/2000 |
| JP | 20020342049 A | 11/2002 |

* cited by examiner

*Primary Examiner* — Talivaldis Ivars Smits
*Assistant Examiner* — Farzad Kazeminezhad
(74) *Attorney, Agent, or Firm* — Canon U.S.A., Inc. IP Division

(57) ABSTRACT

A data processing apparatus including a voice input unit adapted to input voice, an operating unit adapted to be operated by a user, a data processing unit adapted to process data according to voice inputted in the voice input unit or an operation of the operating unit, and a determination unit adapted to determine whether a subsequent process is a voice input prohibited process in the case where the subsequent process is to be conducted based on voice inputted into the voice input unit, wherein the data processing unit switches from processing according to voice inputted in the voice input unit to processing according to an operation of the operating unit in the case where the determination unit determines that the subsequent process is a voice input prohibited process.

16 Claims, 22 Drawing Sheets

DATA PROCESSING WITH AUTOMATIC SWITCHING BACK AND FORTH FROM DEFAULT VOICE COMMANDS TO MANUAL COMMANDS UPON DETERMINATION THAT SUBSEQUENT INPUT INVOLVES VOICE-INPUT-PROHIBITED INFORMATION

BACKGROUND OF THE INVENTION

1. Field of the Invention

The present invention relates to a data processing apparatus, data processing method, and computer program thereof. In particular, the present invention is preferable in processing data according to inputted voice.

2. Description of the Related Art

Conventionally, operation instructions can be inputted by voice. For example, in Japanese Patent Application Laid-Open No. 2000-181292, various operating modes are pre-registered and then called up by simple voice input. The prior art uses a technology of converting inputted voice into text. In other words, the apparatus converts voice into text which can be recognized as operation instructions in the same way as recognizing operation instructions manually entered by a user via an operating panel.

There are conventional methods of inputting a password, such as inputting the identification number using a numeric keypad or a keyboard, or selecting and inputting an element of a password from the displayed content. In addition, there is known an inputting method in which inputted voice is analyzed to extract a voice pattern, and determination is made on whether the voice pattern matches a pre-registered voice pattern to identify the user. Furthermore, there is a method in which a user needs to speak a certain word so that the matching of the voice pattern data can be more easily detected.

A method using the above methods is considered in which a password is inputted by voice using a voice-to-text conversion system. In this method, a password such as "1234" which is conventionally inputted by the user using a numeric key pad is inputted by giving voice as "one, two, three, four".

When an instruction is inputted into a device, it is easier to use voice as compared to manual input that uses an operating unit such as a numeric key pad or a keyboard.

However, in the case where a password is inputted by voice using a voice-to-text conversion system as described above, the password can be heard by other people standing nearby. Thus, unless the device has a voice pattern authentication system, this is a problem for an apparatus in which a password is inputted by voice.

SUMMARY OF THE INVENTION

The present invention is seen to overcome the above-described drawbacks. The present invention is directed to preventing disclosure of confidential information, such as a password, in an apparatus where operation instructions can be inputted by voice.

An aspect of the present invention is a data processing apparatus including a voice input unit adapted to input voice, an operating unit adapted to be operated by a user, a data processing unit adapted to process data according to voice inputted into the voice input unit or an operation of the operating unit, and a determination unit adapted to determine whether a subsequent process is a predetermined process in the case where the subsequent process is to be conducted based on voice inputted into the voice input unit, wherein the data processing unit switches from processing according to voice inputted in the voice input unit to processing according to an operation of the operating unit in the case where the determination unit determines that the subsequent process is a predetermined process.

Another aspect of the present invention is a data processing apparatus including a voice recognition unit adapted to recognize voice inputted into the voice input unit and a registering unit adapted to register voice input-prohibited information that prohibits input into the voice input unit, wherein the determination unit determines whether voice recognized by the voice recognition unit is voice input-prohibited information registered by the registering unit, and the data processing unit switches from processing according to voice inputted in the voice input unit to processing according to an operation of the operating unit in the case where the determination unit determines that the voice recognized by the voice recognition unit is the voice input-prohibited information.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DETAILED DESCRIPTION OF THE EXEMPLARY EMBODIMENTS

Exemplary embodiments of the invention will be described in detail below with reference to the drawings.

Figure 1:
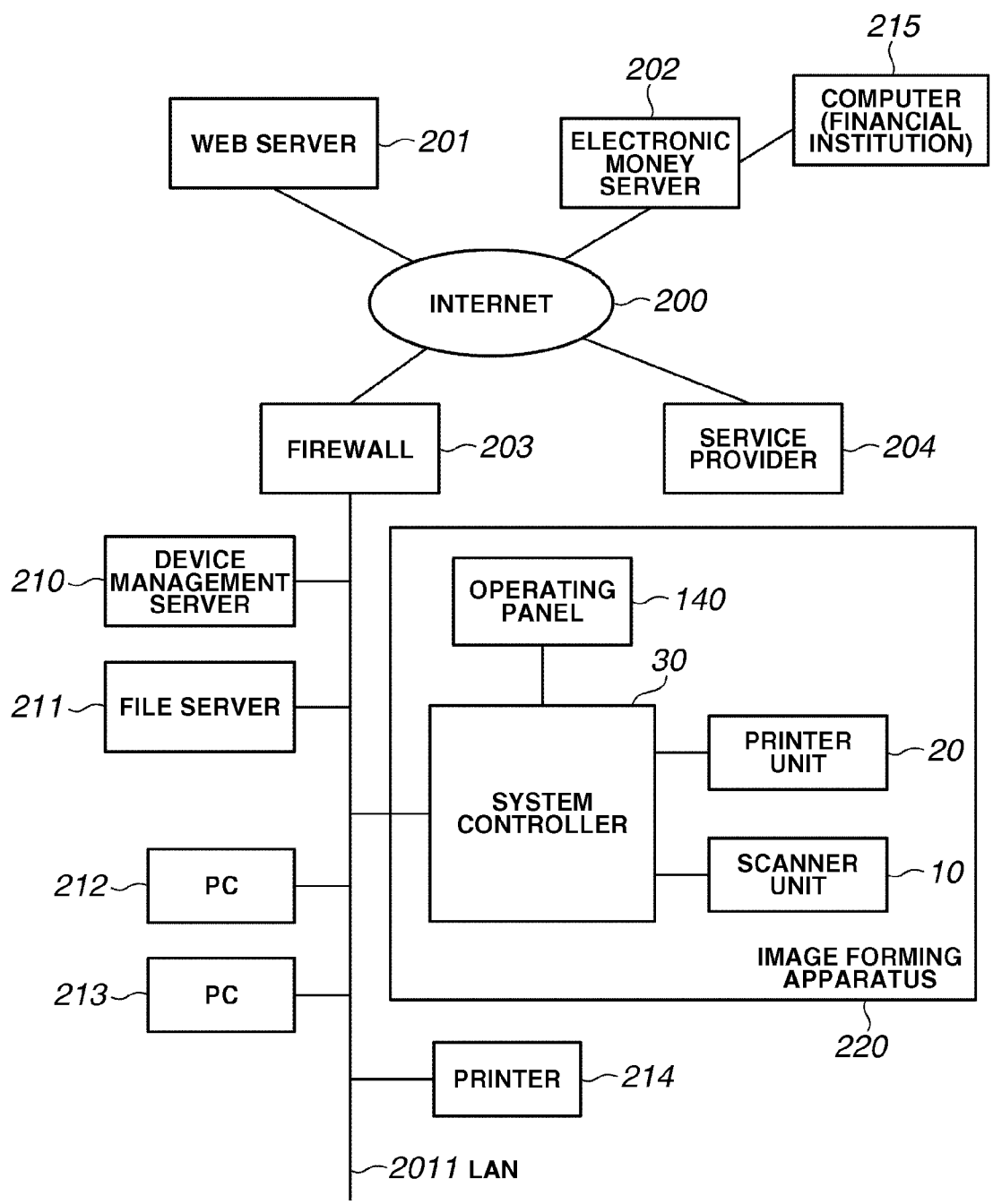
FIG. 1 is an example of a network system according to an exemplary embodiment of the present invention.

FIG. 1 shows a network system of the image forming apparatus to which the present exemplary embodiment is applied.

In FIG. 1, the web server 201 is connected to the Internet 200 and provides specific service to Internet users. The electronic money server 202 conducts transactions between the computer 215 of a financial institution and the personal computers (PCs) 212, 213 of consumers.

The service provider 204 connects the PCs 212, 213 to the Internet 200. The firewall 203 connects the LAN 2011 and the Internet 200, which is an external communication network to the LAN, and conducts security management. The device management server 210 manages the devices on the LAN 2011 (file server 211, PCs 212, 213, printer 214, and the image forming apparatus 220).

The file server 211 stores various data. The plurality of devices on the LAN 2011 can share data by using the file server 211.

The image forming apparatus 220 can be, but is not limited to, a digital copying machine which primarily inputs and outputs images. The image forming apparatus 220 has an operating panel 140 for a user to perform various operations, and an image scanner unit 10 for reading an image according to the instruction from the operating panel 140 or from the PCs 212, 213. In addition, the image forming apparatus 220 has a printer unit 20 for printing data outputted from the PCs 212, 213 or the file server 211 onto a recording medium.

The system controller 30 control input and output of image data onto either one or both of the scanner unit 10 and the printer unit 20. More specifically, the system controller 30 performs control so that the image data read by the scanner unit 10 is stored in the memory (not shown) inside the system controller 30, is outputted onto the PCs 212, 213, or is printed by the printer unit 20.

The printer 214 prints the image data outputted from the PCs 212, 213 or the file server 211 onto a recording medium. The PCs 212, 213 are connected to LAN 2011 as terminals, and display information supplied by the web server 201 through the Internet 200, or output image data onto either the image forming apparatus 220 or the printer 214.

In the configuration of the network system shown in FIG. 1, LAN 2011 is connected to the Internet 200 through the firewall 203. However, the system can also be configured by connecting the firewall through a service provider 204.

Figure 2:
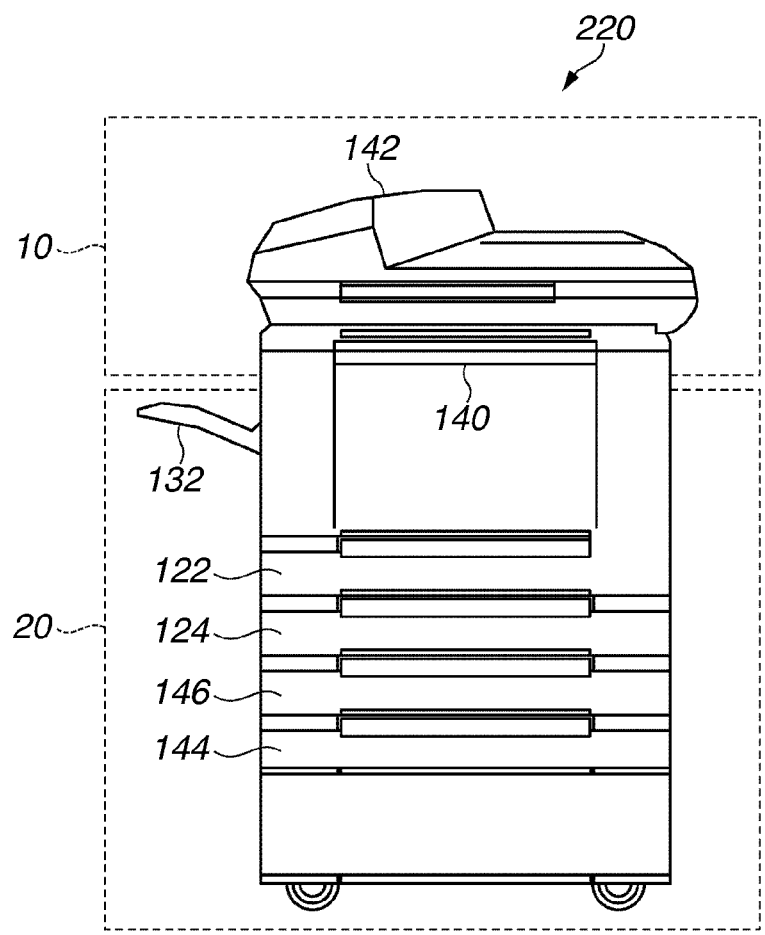
FIG. 2 is an external view of the image forming apparatus according to the exemplary embodiment of the present invention.

FIG. 2 is an external view of the image forming apparatus 220 according to the present exemplary embodiment.

Figure 3:
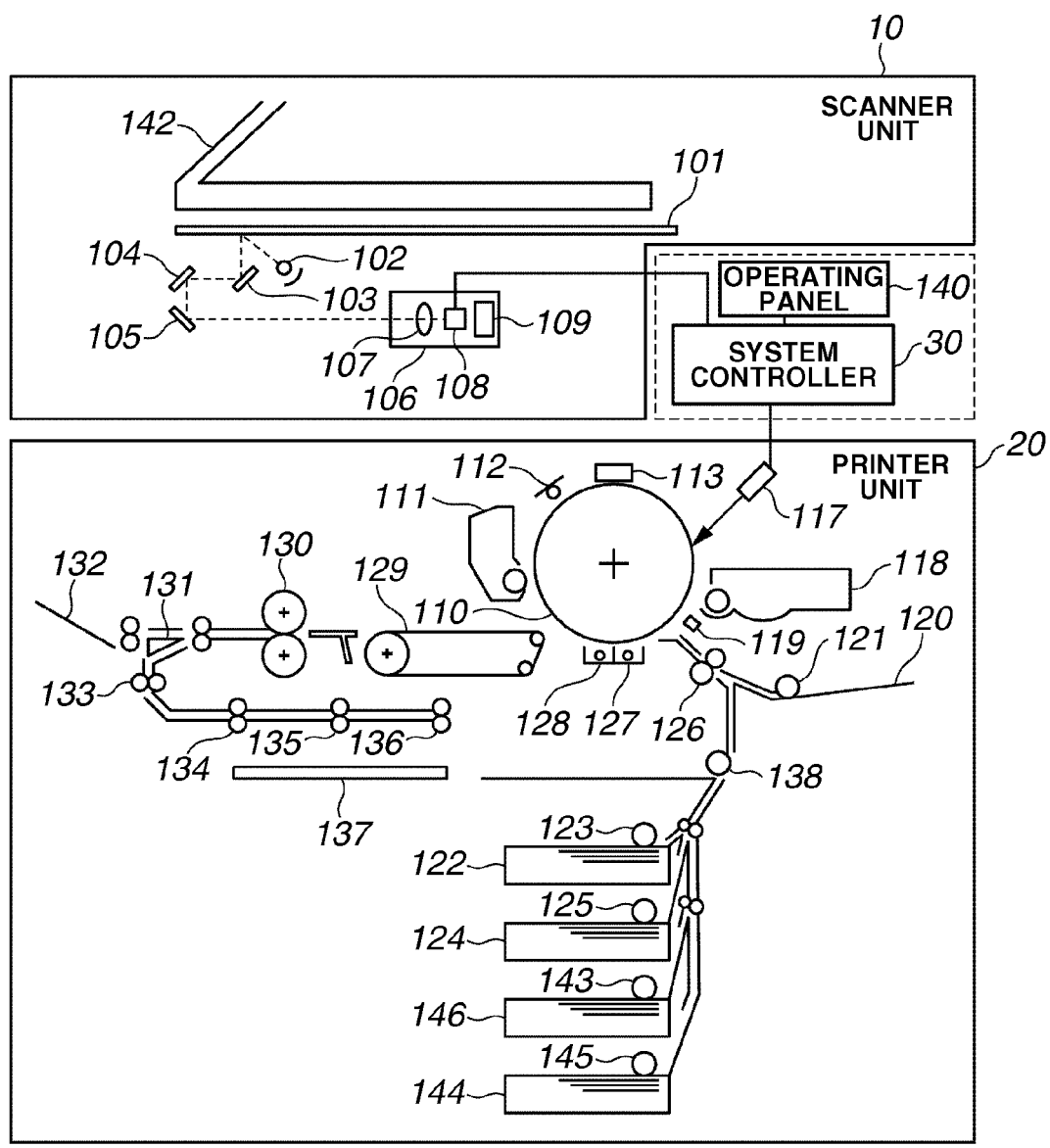
FIG. 3 is a configuration of the interior of the image forming apparatus according to the exemplary embodiment of the present invention.

In FIG. 2, the scanner unit 10, which is an image inputting device, irradiates an original document with light emitted from an irradiating lamp (102 in FIG. 3). A CCD line sensor (not shown) reads the image of the irradiated original, converts the image into an electronic signal, and generates image data. After setting the original onto the feeder 142, the user operates the operating panel 140 to instruct the image forming apparatus 220 to begin reading the original document. The original document is fed by the feeder 142 on the scanner unit 10, and the image on the original document is read. The original document can also be read by opening the top of the scanner unit 10 and placing the original document on a platen (not shown).

The printer unit 20, which is an image outputting device, converts image data to an image on a recording medium. The present exemplary embodiment describes an example in which the printer unit 20 forms an image on a recording medium by an electrophotographic method using a photosensitive drum and a photosensitive belt or the like. However, the printer can also be of an ink jet type, which directly prints images on a recording medium by discharging ink from microscopic nozzle alleys.

The printing is initiated by an instruction from the system controller 30 in the image forming apparatus 200, which will be described later. The printer unit 20 includes a plurality of recording medium feed portions (not shown) so that a user can select from different recording medium sizes or setting directions, and recording medium cassettes 122, 124, 144, and 146 corresponding to the recording medium feed portions. The recording medium on which the image is formed is ejected onto the recording medium ejection tray 132.

FIG. 3 describes a configuration of the interior of the image forming apparatus 200 according to the present exemplary embodiment.

In FIG. 3, the original document fed by the feeder 142 is sequentially mounted onto a predetermined position on the original holder glass 101. The irradiating lamp 102 such as a halogen lamp exposes the original document mounted on the original holder glass 101.

Scanning mirrors 103, 104, 105 are contained in the optical scanning unit (not shown), and reflect the light from the original document to the CCD unit 106 making a back and forth movement. The CCD unit 106 can be configured by an image sensing device 108, such as a CCD, an image forming lens 107, which focuses the reflected light from the original document onto the image sensing device 108, and a CCD driver 109, which drives the image sensing device 108.

The image signal outputted from the image sensing device 108 is converted to an 8 bit digital data by the system controller 30 and inputted into the printer unit 20. The photosensitive drum 110 in the printer unit 20 is subjected to static elimination by the exposing lamp 112 before image formation. The primary charger 113 charges the photosensitive drum 110 uniformly.

The exposing device 117 includes components such as a laser diode. The exposing device 117 exposes the photosensitive drum 110 according to the image data processed by the system controller 30, and forms an electrostatic latent image. The developing device 118 contains a black developer (i.e., toner). The pre-transfer charger 119 charges the toner image with high voltage before the toner image developed on the photosensitive drum 110 is transferred to a recording medium.

Driven by feed rollers 121, 123, 125, 143, and 145, the recording medium in the manual recording medium feed unit 120 or in the automatic recording medium feed units 122, 124, 144, and 146 is fed into the image forming apparatus 220.

The recording medium fed into the image forming apparatus 220 stops at the position of the resist roller 126 to wait for the timing to transfer the toner image developed on the photosensitive drum 110, and then is fed again. The transfer charger 127 transfers the toner image developed on the photosensitive drum 110 onto the fed recording medium. The separation charger 128 separates the recording medium from the photosensitive drum 110 after the transfer is completed. The residual toner on the photosensitive drum 110 that is not transferred to the recording medium is recovered by the cleaner 111.

The transfer belt 129 conveys the recording medium on which the toner image is transferred, to the fixing device 130. The fixing device 130 fixes the toner image on the conveyed recording medium, for example, by using heat. The flapper 131 controls whether the recording medium on which the toner image is fixed is conveyed toward the sorter 132 or the intermediate tray 137. The feeding rollers 133, 134, 135, 136 feed the recording medium on which the toner image is fixed to the intermediate tray 137 in a reversed (e.g., multiple copying) or non-reversed (e.g., two-sided copying) state. The re-feed roller 138 conveys the transfer recording medium placed on the intermediate tray 137 to the position of the registration rollers 126 again.

The system controller 30 includes components such as a microcomputer, which will be described later, and an image processing unit, and performs image formation as described above according to instructions from a user inputted via the operating panel 140.

Figure 4:
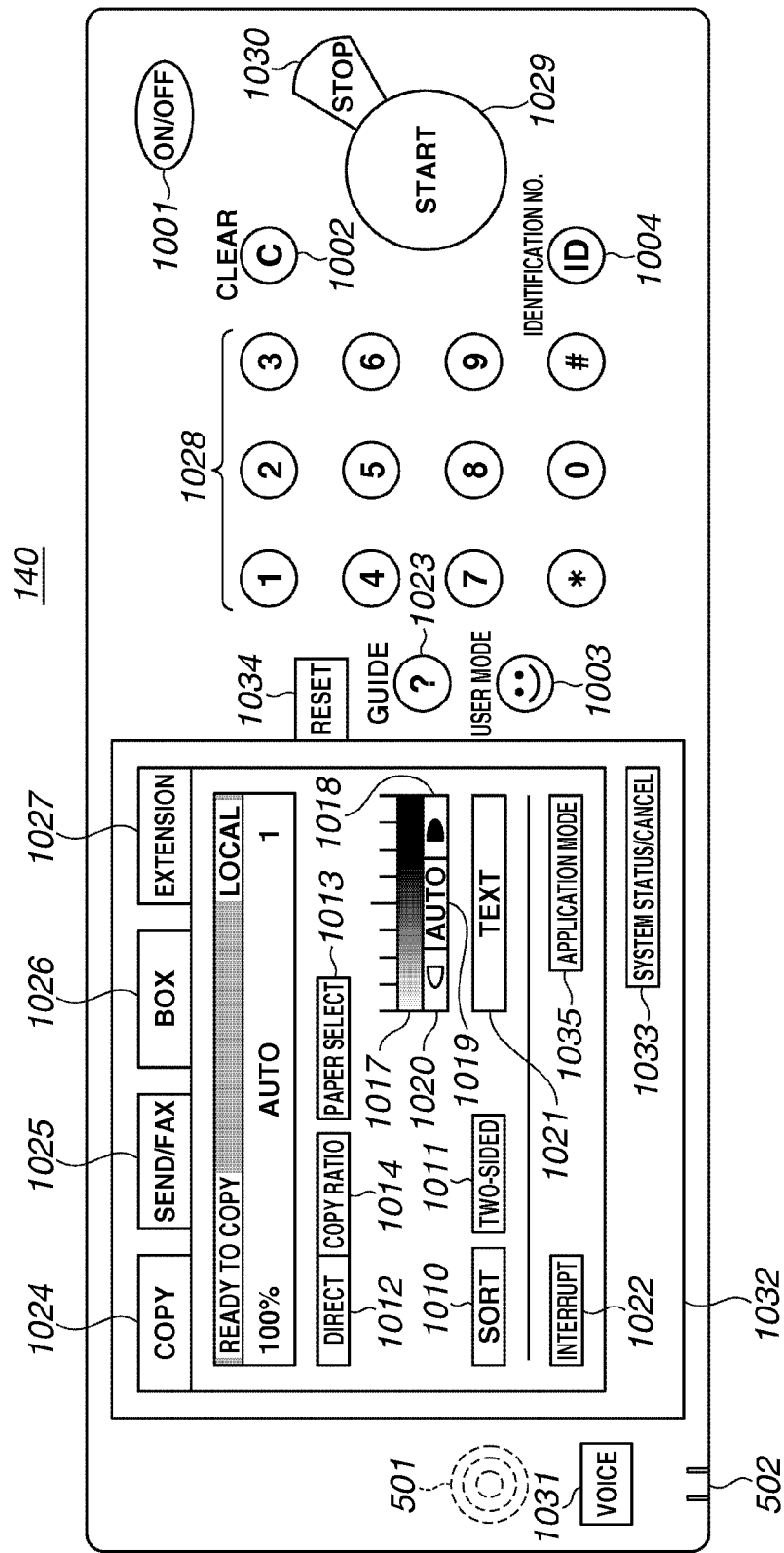
FIG. 4 is a configuration of the operating panel of the image forming apparatus according to the exemplary embodiment of the present invention.

FIG. 4 is a configuration of the operating panel 140 in the image forming apparatus 220 according to the present exemplary embodiment.

In FIG. 4, the soft power switch 1001 is used for setting the image forming apparatus 220 in a sleep state or for recovering from a sleep state. The liquid crystal display (LCD) display unit 1032 includes a LCD and a touch panel sheet applied on the LCD, and displays a screen for operating the system. When a key displayed on the LCD display unit 1032 is selected, the system controller 30 is informed of its position. The numeric key pad 1028 is used for inputting a number such as the number of copies. The clear key 1002 is used for clearing an inputted numerical value.

The identification number (ID) key 1004 is used for inputting the ID in the case where an operation such as copying is prohibited unless an ID is inputted. The start key 1029 is used to start reading of an image printed on an original document. The stop key 1030 is used for stopping an operation. The reset key 1034 is used for initializing the setting made on the operating panel 140.

The user mode key 1003 enables registering of the mode memory and setting of the standard mode screen for each user. The guide key 1023 is used when the user does not know the functions of the keys on the operating panel 140. By depressing a key of an unknown function after depressing the guide key 1023, an explanation of the key is displayed on the LCD display unit 1032.

The copy mode key 1024 is used for copying. The send/fax key 1025 is used to send a scanned image by e-mail or to make a setting for using a facsimile. The box key 1026 is used to output data stored in the HDD 2004 shown in FIG. 6 which will be described later. The extension key 1027 is used for performing extended functions, such as a remote scan.

The voice key 1031 is used when input and output are to be conducted by voice. When the user depresses the voice key 1031 once, the voice input/output mode is set. In the case where the set voice input/output mode is turned on, the user depresses the voice key 1031 again, and the voice input/output mode is canceled. The speaker 501 outputs the guidance by voice. The microphone 502 is used for inputting voice.

The sort key 1010 is used in setting the mode for sorted output or grouped output. The two-sided key 1011 is used to copy an original printed on two sides or to set a two-sided output. The direct key 1012 is used when the copy ratio is 100%. The copy ratio key 1014 is used in reducing or enlarging to a standard size format, or to a non-standard size format by a unit of 1%.

The paper select key 1013 is for selecting a paper (recording medium) on which the image of an original document is to be copied. The density key 1018 is used in making a darker copy, and the density increases as the density key 1018 is pressed. The density key 1020 is used in making a lighter copy, and the density decreases as the density key 1020 is pressed.

The position of the density display pointer 1017 changes to the right and to the left according to the operations on the density keys 1018 and 1020. The automatic density key 1019 is used in copying of a document, such as a newspaper, in which background optical density is high, and the density is automatically adjusted. The original selection key 1021 is used in copying an original, such as a photograph, in which the density is in a substantial portion halftone, or copying an original so that the characters are to be highlighted. The interrupt key 1022 is used in the case where the user wants to make a copy while printing. The application mode key 1035 is used to set functions such as continuous copying, reduced scale layout, and enlarged layout. The system status/cancel key 1033 is used for setting a function or confirming the status of a job in the image forming apparatus 220.

Figure 5:
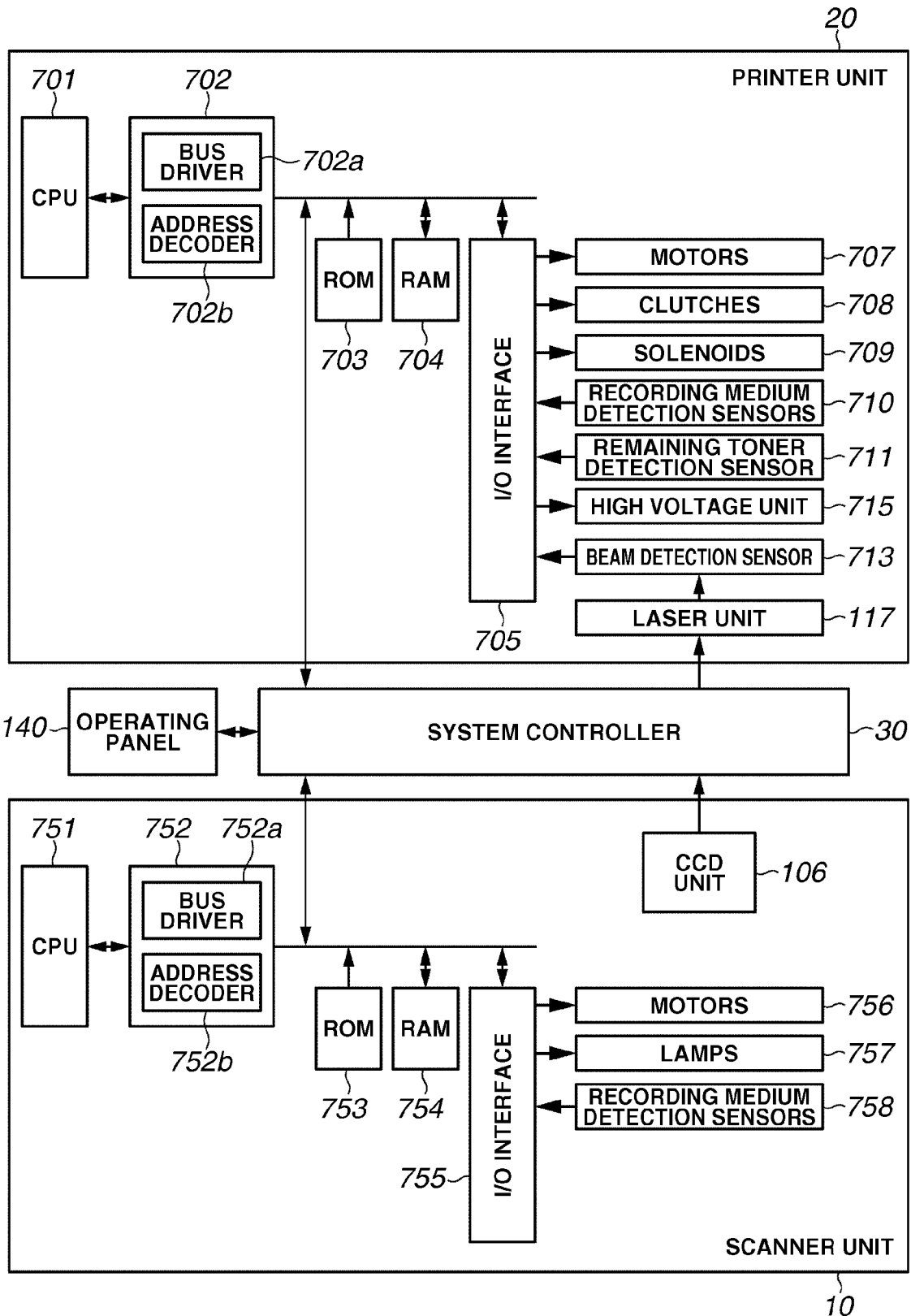
FIG. 5 is a block diagram showing a configuration example of the scanner unit and the printer unit in the image forming apparatus according to the exemplary embodiment of the present invention.

FIG. 5 is a block diagram of a configuration of the scanner unit 10 and the printer unit 20 in the image forming apparatus 220.

In FIG. 5, the CPU 751 in the scanner unit 10 controls the entire scanner unit 10. The CPU 751 sequentially reads out the control programs (control procedures) stored in the read-only memory (ROM) 753, and executes them. The address bus and the data bus of the CPU 751 are connected to each load through the circuit 752 (bus driver circuit 752a and address decoder circuit 752b). In addition, the address bus and the data bus of the CPU 751 are interconnected with the CPU (not shown) of the system controller 30 to enable communication between the scanner unit 10 and the system controller 30.

The random-access memory (RAM) 754 serves as a main memory device, and is used for storing input data and as a work area. The input/output (I/O) interface 755 is connected to loads such as motors 756 that drive the recording medium feed system, conveying system, and the optical system. The interface 755 is also connected to lamps 757, and to the recording medium detection sensors 758 that detect the conveyed recording medium. The image data read by the CCD unit 106 is transferred to the system controller 30.

The CPU 701 of the printer unit 20 controls the entire printer unit 20, sequentially reads the control programs (control procedures) stored in the read-only memory (ROM) 703, and executes them. The address bus and the data bus of the CPU 701 are connected to each load through the circuit 702, which includes a bus driver circuit 702*a* and an address decoder circuit 702*b*. In addition, the random-access memory (RAM) 704 serves as the main storage device for storing inputted data, and as a work area.

The input/output (I/O) interface 705 is connected to loads such as the motors 707 for driving the recording medium feed system, conveyance system, and the optical system, the clutches 708, the solenoids 709, and the recording medium detection sensors 710 for detecting the conveyed recording medium. A remaining toner detection sensor 711 for detecting the amount of toner in the developing device 118 as shown in FIG. 3 is set inside the developing device 118. The output signal from the remaining toner detection sensor 711 is inputted to the I/O interface 705. The high voltage unit 715 outputs high voltage to the primary charger 113, developing device 118, pre-transfer charger 119, transfer charger 127, and separation charger 128.

The system controller 30 generates image data by performing image processing, described later, on the image signal outputted from the CCD unit 106 and outputs control signals of the laser unit 117 in accordance with the created image data. The laser beam outputted from the laser unit 117 irradiates and exposes the photosensitive drum 110. The emitting state of the laser beam outputted from the laser unit 117 is detected by the beam detection sensor 713 which is an optical sensor, and the output signal indicating the detected result is inputted to the I/O interface 705.

Figure 6:
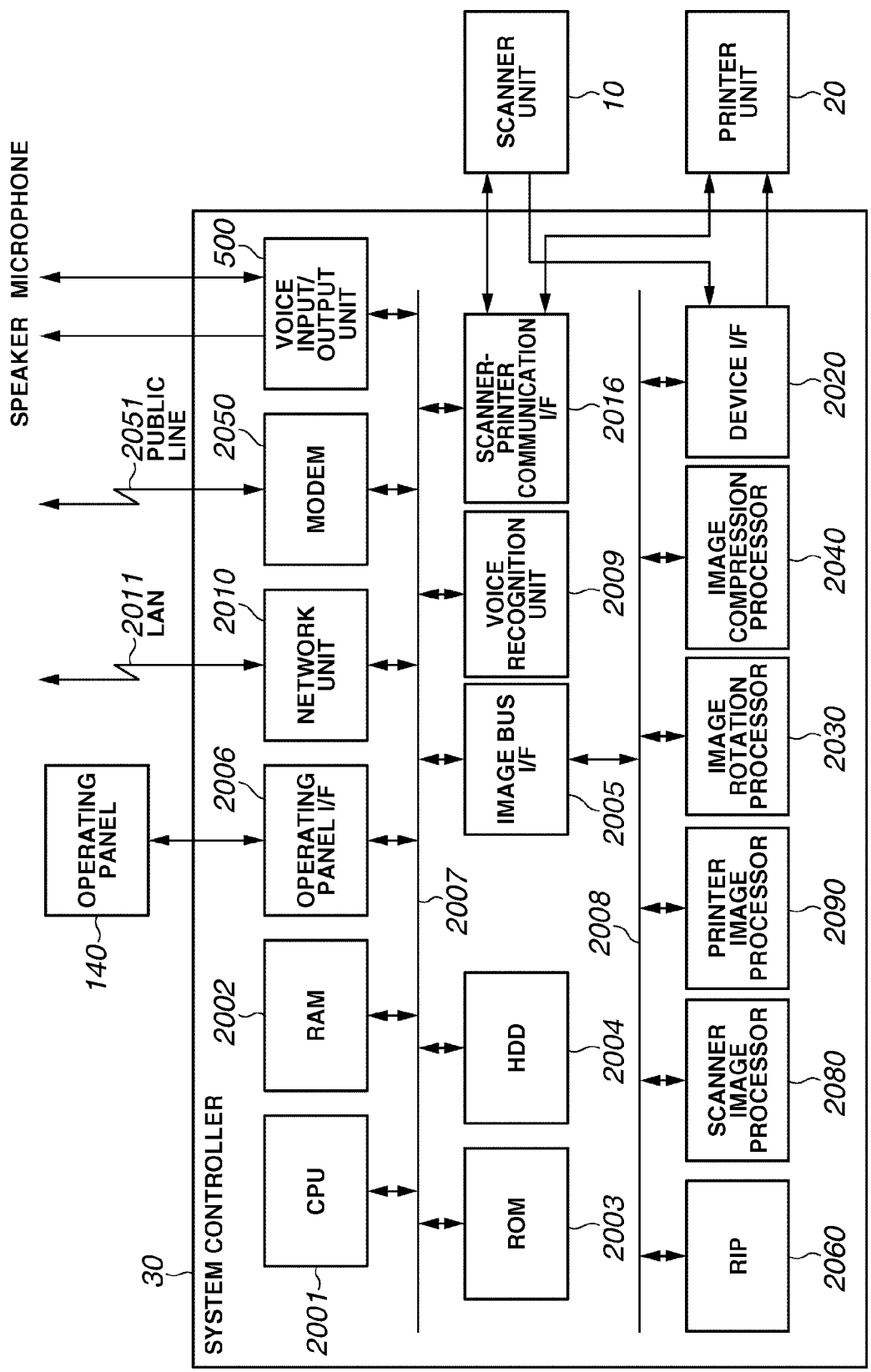
FIG. 6 is a configuration of the controller unit according to the exemplary embodiment of the present invention.

FIG. 6 is a configuration of the system controller 30.

The system controller 30 connects the scanner unit 10, which is an image inputting device, with the printer unit 20, which is an image outputting device. In addition, the system controller 30 inputs and outputs image information and device information by connecting with LAN 2011 and the public line (WAN) 2051.

The CPU 2001 controls the entire system. The RAM 2002 is a system work memory for the CPU to operate, and an image memory for temporarily storing image data. The ROM 2003 is a boot ROM which stores the boot program of the system. The HDD 2004 is a hard disk drive which stores system software, image data, software counter value, and voice input-prohibited information list 1703 (refer to FIG. 21).

The operating panel interface (I/F) 2006 interfaces with the operating panel 140 and outputs image data that is displayed on the operating panel 140. The operating panel I/F 2006 also sends the CPU 2001 information that a user of the system of the present exemplary embodiment enters via the operating panel 140. The network unit 2010 is connected to LAN 2011 and serves to input and output information. The modem 2050 is connected to the public line 2051 and serves to input and output information.

The voice input-output unit 500 controls outputting voice to the speaker 501 or to inputting voice from the microphone 502. The scanner-printer communication interface (I/F) 2016 is an interface for communicating with the CPU 751 of the scanner unit 10 and the CPU 701 of the printer unit 20. The voice recognition unit 2009 recognizes and converts the voice taken in from the microphone 502 by the voice input-output unit 500 into text data. The voice converted to the text data is recognized by the CPU 2001 as a specific operation instruction and is executed. The above devices are arranged on the system bus 2007.

The image bus interface (I/F) 2005 is a bus bridge for connecting the system bus 2007 and the image bus 2008, which transfers image data at high speed and converts the data structure. The image bus 2008 is comprised of a PCI bus, an IEEE1394 bus, or any other type of bus that would enable practice of the present invention. The devices set forth below are connected to the image bus 2008.

The raster image processor (RIP) 2060 expands PDL code into a bit map image. The device interface (I/F) 2020 connects the scanner unit 10 and the printer unit 20 (i.e., the image input and output devices) with the system controller 30 and with each other, and subjects image data to a synchronous and asynchronous conversion. The scanner image processor 2080 corrects, manipulates, and edits inputted image data. The printer image processor 2090 corrects and converts the resolution of image data to be outputted by the printer. The image rotation processor 2030 rotates the image data. The image compression processor 2040 subjects multilevel image data to JPEG compression/decompression processing and subjects binary image data to JBIG, MMR, or MH compression/expansion processing.

Each block of the system controller 30 is described below.

Figure 7:
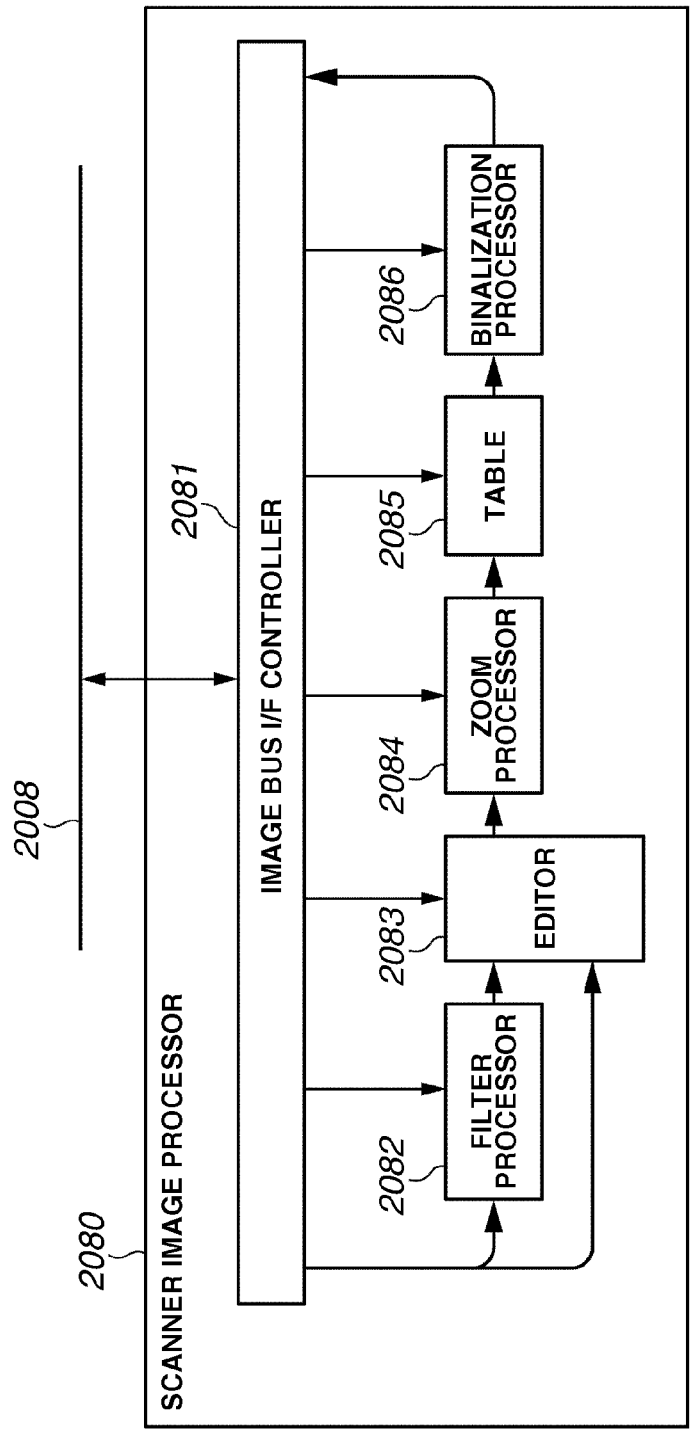
FIG. 7 is a block diagram showing a configuration of the scanner image processor according to the exemplary embodiment of the present invention.

FIG. 7 is a block diagram of a configuration of the scanner image processor 2080. The image bus I/F controller 2081 connects with the image bus 2008 to control its bus access sequence. The image bus I/F controller 2081 also controls and generates timings of respective devices in the scanner image processor 2080.

The filter processor 2082 performs convolution calculation using a spatial filter. The editor 2083 recognizes a closed region bounded by a marker pen from input image data, and performs image modification processes such as shading, hatching, and negative-positive inversion, on the image data in that closed region. The zoom processor 2084 enlarges and reduces the image by making interpolation operations in the main scan direction of a raster image when the resolution of the scanned image is to be changed. The magnification in the sub-scan direction is attained by changing the scan speed of the line sensor (not shown) that scans an image. The table 2085 stores information used for converting image data as scanned luminance data into density data. The binarization processor 2086 binarizes the multi-valued gray scale image data by error diffusion, a screening process, or the like. Image data that has undergone the binarization process of the binarization processor 2086 is transferred onto the image bus 2008 through the bus controller 2081.

Figure 8:
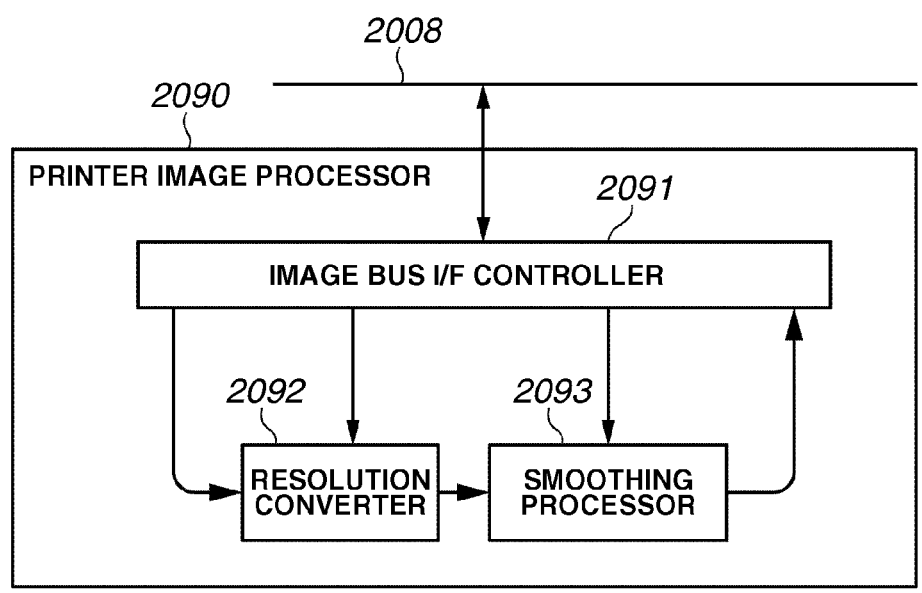
FIG. 8 is a block diagram showing a configuration of the printer image processor according to the exemplary embodiment of the present invention.

FIG. 8 is a block diagram of a configuration of the printer image processor 2090.

In FIG. 8, the image bus interface (I/F) controller 2091 connects with the image bus 2008 to control its bus access sequence, and controls and generates timings of respective devices in the printer image processor 2090. The resolution converter 2092 performs resolution conversion on image data coming from the LAN 2011 or the public line 2051 into the resolution of the printer 20. The smoothing processor 2093 performs a process for smoothing the jaggy (e.g., stair-casing of an image appearing at the black and white boundary such as an oblique line) of image data after the resolution conversion is performed.

Figure 9:
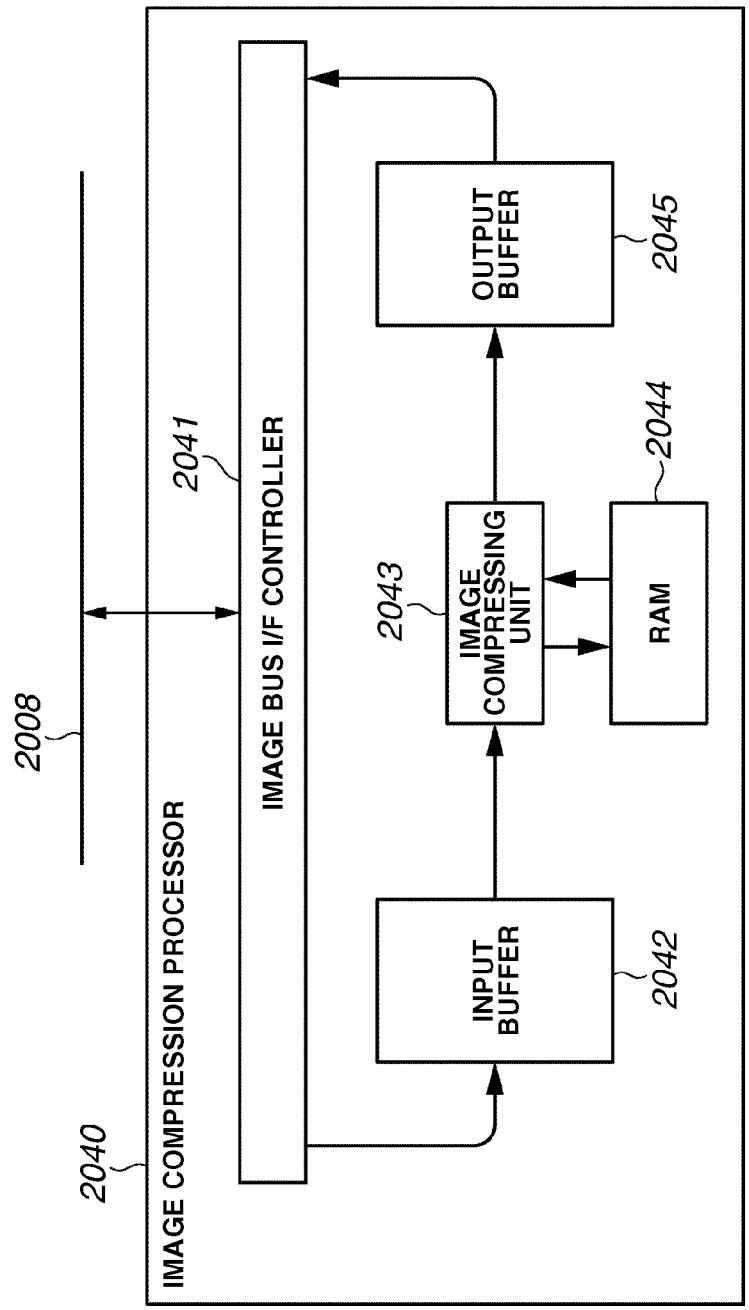
FIG. 9 is a block diagram showing a configuration of the image compression processor according to the exemplary embodiment of the present invention.

FIG. 9 is a block diagram of a configuration of the image compression processor 2040.

In FIG. 9, the image bus interface (I/F) controller 2041 connects with the image bus 2008 and controls its bus access sequence. The image bus interface (I/F) controller 2041 also controls timing to exchange data with the input buffer 2042 and the output buffer 2045. Furthermore, the image bus I/F controller 2041 controls setting a mode of the image compression unit 2043. An example of the image compression process in the image compression processor will be described below.

The CPU 2001 instructs the image bus I/F controller 2041 through the image bus 2008 to perform image compression control. In accordance with this instruction, the image bus I/F controller 2041 makes settings required for image compression, such as settings of MMR compression, JBIG expansion, and the like, in the image compression unit 2043. After the required settings are finished, the CPU 2001 issues permission to transfer image data to the image bus I/F controller 2041. In accordance with this permission, the image bus I/F controller 2041 starts image data transfer from RAM 2002 or a device on the image bus 2008.

The transferred image data is temporarily stored in the input buffer 2042 and is transferred at a constant speed in response to a request from the image compression unit 2043. In this stage, the input buffer 2042 determines whether the image data can be transferred between the image bus I/F controller 2041 and the image compression unit 2043. If it is determined that image data cannot be read from the image bus 2008 and cannot be written to the image compression unit 2043, the input buffer 2042 performs control to inhibit data transfer. Hereinafter, such control will be referred to as "handshake".

The image compression unit 2043 temporarily stores the received image data in RAM 2044. This is because data of several lines may be required to implement image compression depending on the image compression process to be executed. That is, the first line of image data can be compressed only after image data of several lines have been prepared. The image data that has undergone image compression is immediately sent to the output buffer 2045. A handshake between the output buffer 2045 and the image bus I/F controller 2041 and the image compression unit 2043 occurs, and the output buffer 2045 transfers the image data to the image bus I/F controller 2041.

The image bus I/F controller 2041 transfers the compressed (or expanded) image data transferred from the image compression unit 2043 to the RAM 2002 or a device on the image bus 2008. This series of processes repeat themselves until the CPU 2001 ceases to issue a process request, or until the image compression unit 2043 issues a stop request. CPU 2001 ceases to issue a process request when, for example, the processing of a required number of pages is completed. The image compression unit 2043 issues a stop request when, for example, errors occur in compression and expansion process.

Figure 10:
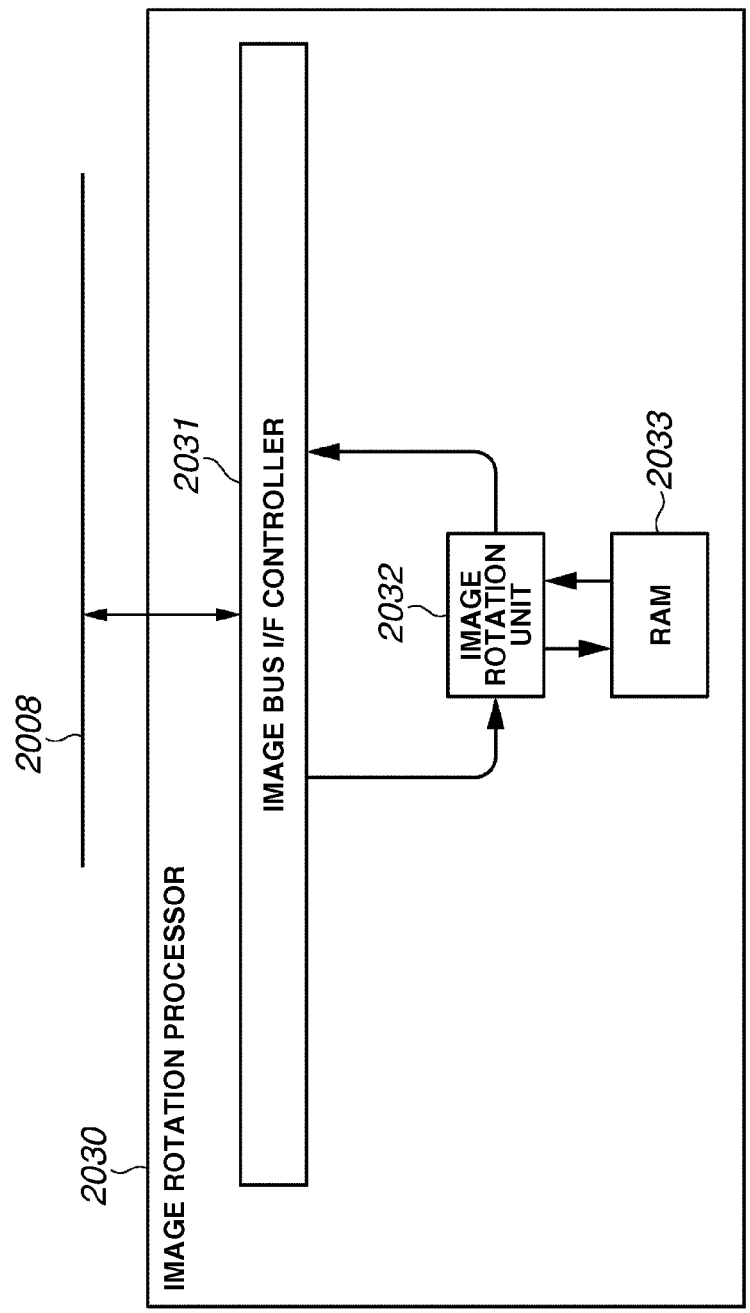
FIG. 10 is a block diagram showing a configuration of the image rotation processor according to the exemplary embodiment of the present invention.

FIG. 10 is a block diagram of a configuration of the image rotation processor 2030.

In FIG. 10, the image bus interface (I/F) controller 2031 connects with the image bus 2008 to control its bus access sequence. The image bus interface (I/F) controller 2031 also performs control to set a mode and the like in an image rotation unit 2032. Further, the image bus interface (I/F) controller 2031 controls timing to transfer image data to the image rotating unit 2032. An example of the image rotation process will be described below.

The CPU 2001 issues an instruction to control image rotation in the image bus I/F controller 2031 through the image bus 2008. In accordance with this instruction, the image bus I/F controller 2031 makes setting required for image rotation, such as the image size, rotation direction, and angle, to the image rotation unit 2032. When the required setting is completed, the CPU 2001 issues permission to transfer image data, to the image bus I/F controller 2031. In accordance with this permission, the image bus I/F controller 2031 begins to transfer image data from the RAM 2002 or a device on the image bus 2008. In the present exemplary embodiment, the image size which undergoes rotation is 32×32 bits. The image data is transferred to the image bus 2008 in units of 32 bits (presume that a binary image is to be processed in the case).

Figure 11:
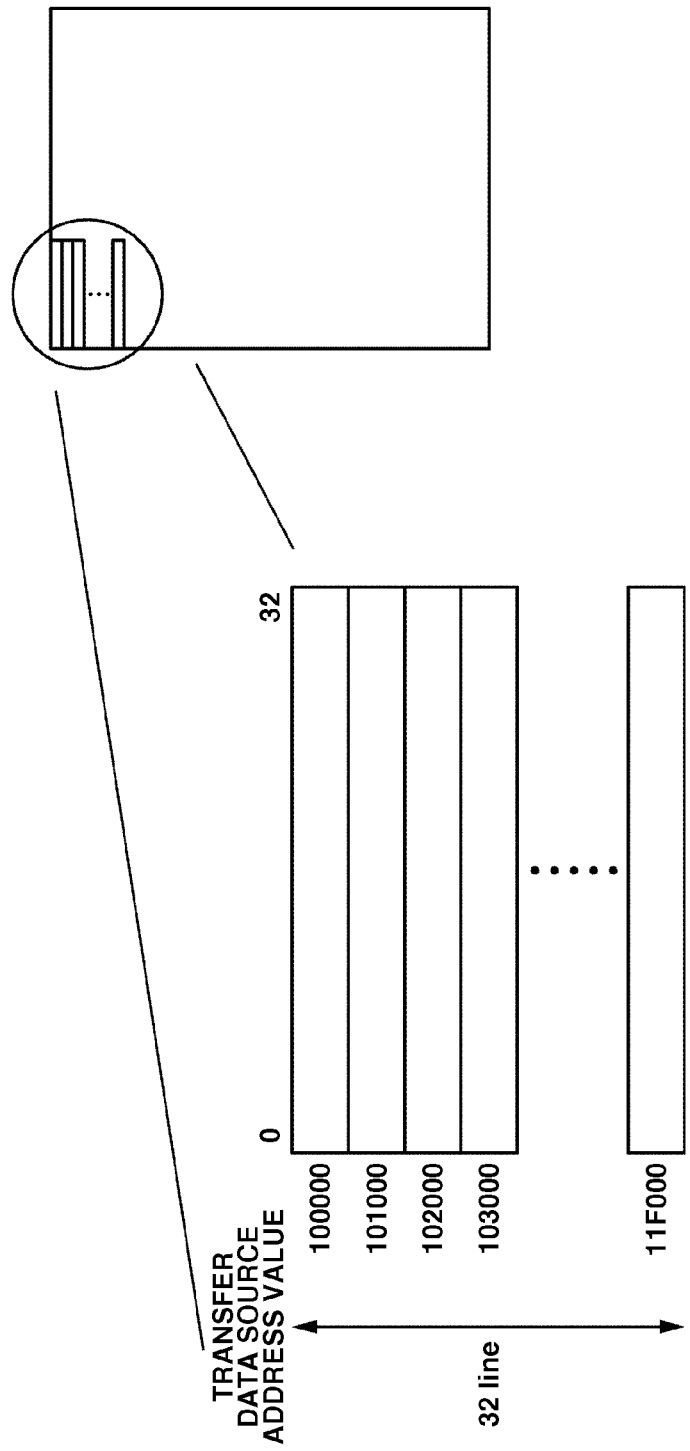
FIG. 11 is a schematic diagram showing how a rotated image is transferred according to the exemplary embodiment of the present invention.

In order to obtain a 32×32 bits image, as described above, data transfer in units of 32 bits must be done 32 times as shown in FIG. 11, and image data must be transferred from discontinuous addresses.

Figure 12:
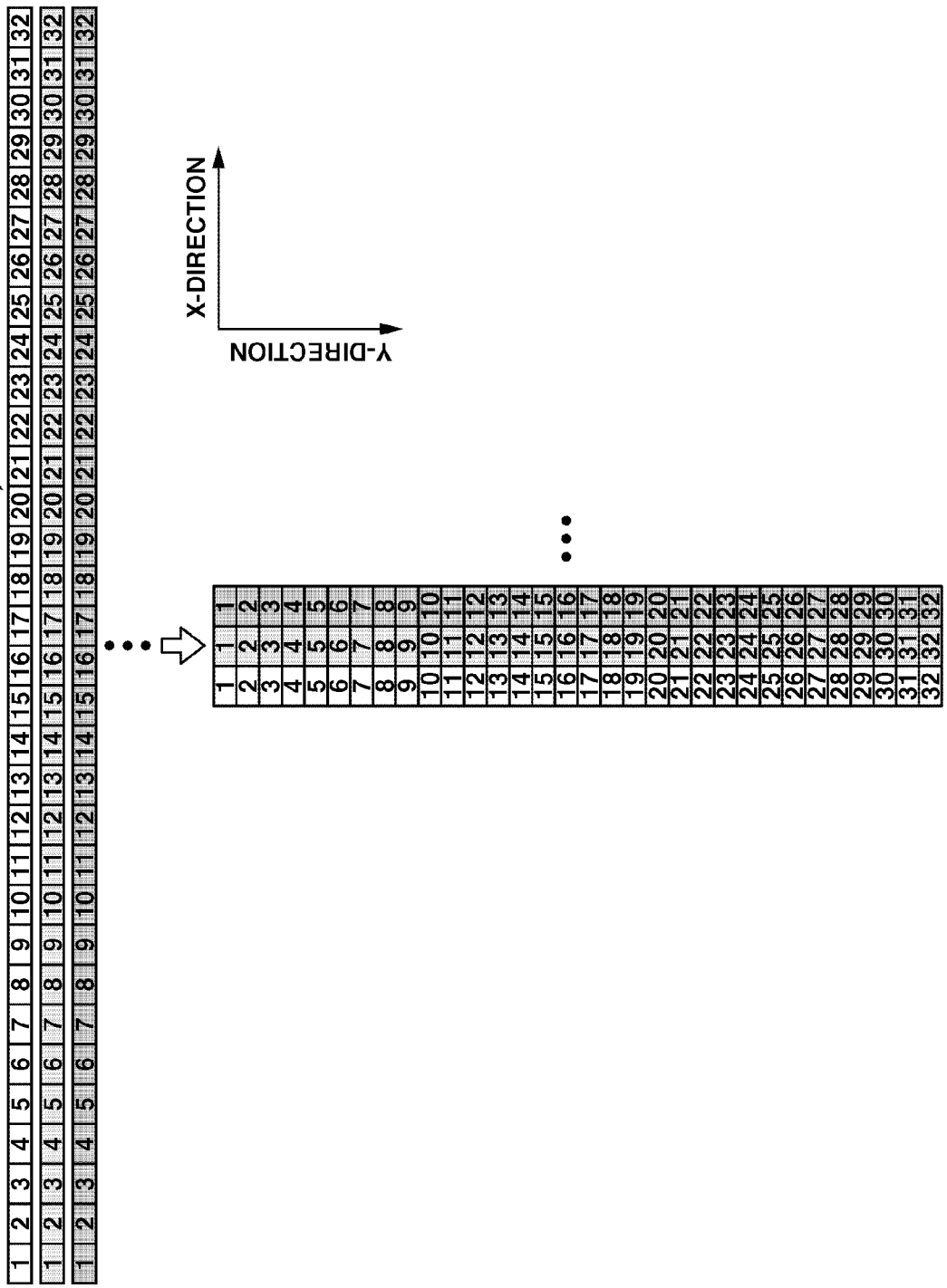
FIG. 12 is a schematic diagram showing how a rotated image is written and read out according to the exemplary embodiment of the present invention.

Image data transferred by discontinuous addressing is written in RAM 2033 so as to be rotated at a desired angle when it is read out. For example, in the case of rotating in the direction of 90 degrees counterclockwise, the initially transferred 32-bit image data 1200 is written in the Y-direction, as shown in FIG. 12. The image is rotated when the written image data is read out in the X-direction.

After 32×32 bits image rotation (write to RAM 2033) is finished, the image rotation section 2032 reads out image data from the RAM 2033 by the aforementioned read method and transfers that image data to the image bus I/F controller 2031.

When the rotated image data is received, the image bus I/F controller 2031 transfers the data to the RAM 2002 or a device on the image bus 2008 by continuous addressing. These series of processes repeat themselves until the CPU 2001 ceases to issue a process request. CPU 2001 ceases to issue a process request when, for example, a required number of pages are processed.

Figure 13:
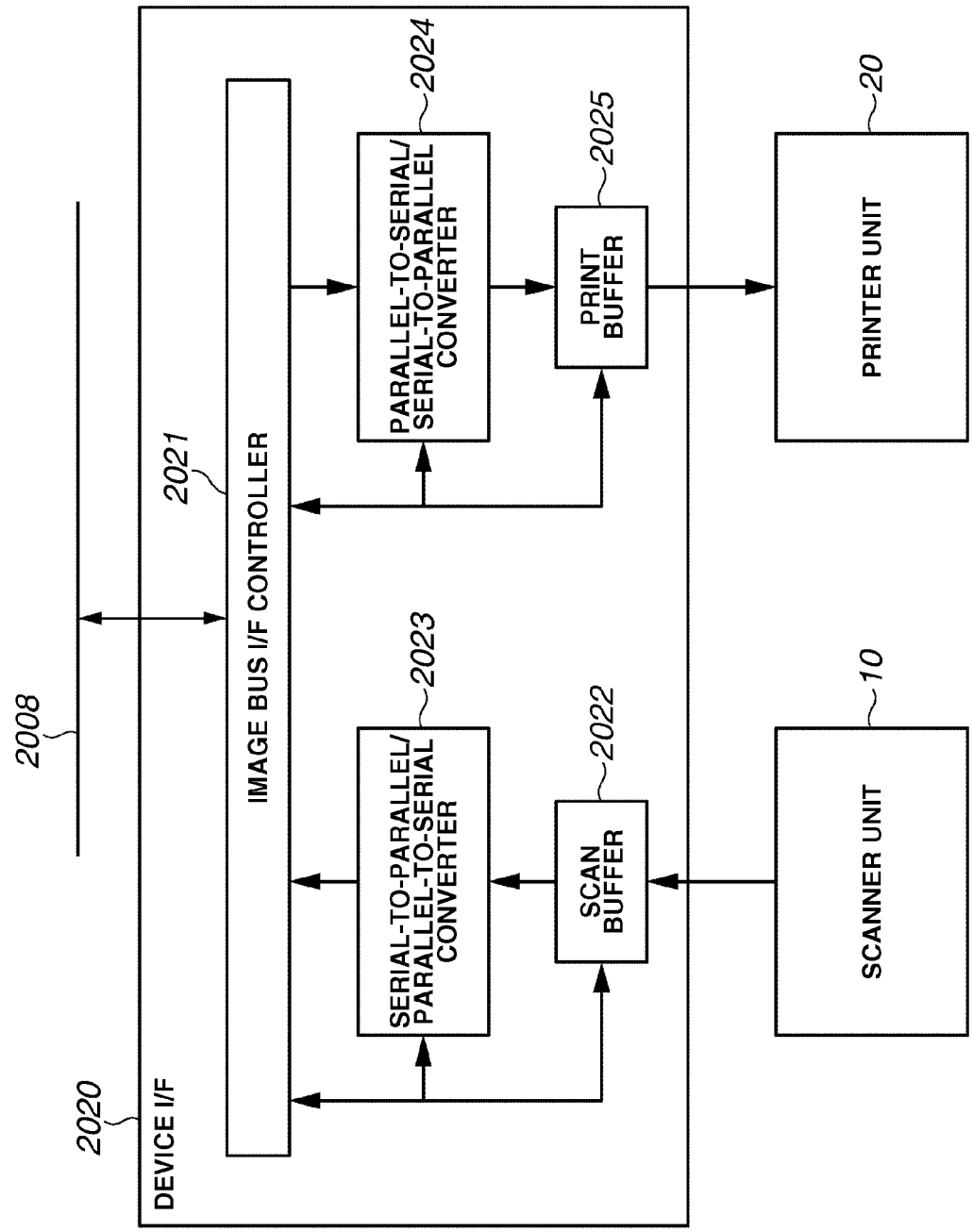
FIG. 13 is a configuration of the device interface (I/F) according to the exemplary embodiment of the present invention.

FIG. 13 is a block diagram of a configuration of the device I/F 2020.

In FIG. 13, the image bus interface (I/F) controller 2021 connects with the image bus 2008 to control its bus access sequence. The image bus interface (I/F) controller 2021 also controls timings of devices within the device I/F 2020. In addition, the controller 2021 outputs control signals to the scanner unit 10 and the printer unit 20.

The scan buffer 2022 temporarily saves image data sent from the scanner unit 10, and synchronously outputs the image data onto the image bus 2008. The serial-to-parallel/parallel-to-serial converter 2023 arranges in a given order or resolves the image data which are stored in the scan buffer 2022. That is, the serial-to-parallel/parallel-to-serial converter 2023 converts the data width of image data so that the data can be transferred onto the image bus 2008.

The parallel-to-serial/serial-to-parallel converter 2024 converts the image data transferred from the image bus 2008 into the data width that can be stored in a print buffer 2025 by resolving the image data or arranging in a given order. The print buffer 2025 temporarily saves image data sent from the image bus 2008, and outputs image data synchronously with the printer unit 20.

The processing sequence of the device I/F 2020 when image is scanned will be described below.

The image bus I/F controller 2021 saves image data sent from the scanner unit 10 in the scan buffer 2022 in synch with a timing signal sent from the scanner unit 10. In the case where the image bus 2008 is a PCI bus, when 32 bits or more image data are saved in the scan buffer 2022, the image data for 32 bits are sent from the scan buffer 2022 to the serial-to-parallel/parallel-to-serial converter 2023 by first-in-first-out (FIFO).

The serial-to-parallel/parallel-to-serial converter 2023 converts the received image data into 32-bit image data, and the converted image data is transferred onto the image bus 2008 through the image bus I/F controller 2021. On the other hand, in the case where the image bus 2008 is an IEEE1394 bus, image data in the scanner buffer 2022 is sent to the serial-to-parallel/parallel-to-serial converter 2023 by FIFO. The serial-to-parallel/parallel-to-serial converter 2023 converts the received image data to serial image data, and the serial image data is transferred onto the image bus 2008 through the image bus I/F controller 2021.

The processing sequence of the device I/F 2020 when an image is printed will be described below. In the case where the image bus 2008 is a PCI bus, 32-bit image data sent from the image bus 2008 is received by the image bus I/F controller 2021, and is sent to the parallel-to-serial/serial-to-parallel converter 2024. Here, the image data is resolved into image data corresponding to the bit number of input data which the printer unit 20 can receive, and is saved in the print buffer 2025.

In the case where the image bus 2008 is an IEEE1394 bus, serial data sent from the image bus 2008 is received by the image bus I/F controller 2021, and is sent to the parallel-to-serial/serial-to-parallel converter 2024. Here, the image data is converted into image data corresponding to the bit number of input data which the printer unit 20 can receive, and is saved in the print buffer 2025. The image bus I/F controller 2021 sends image data in the print buffer 2025 to the printer unit 20 by FIFO in synch with a timing signal sent from the printer unit 20.

Figure 14:
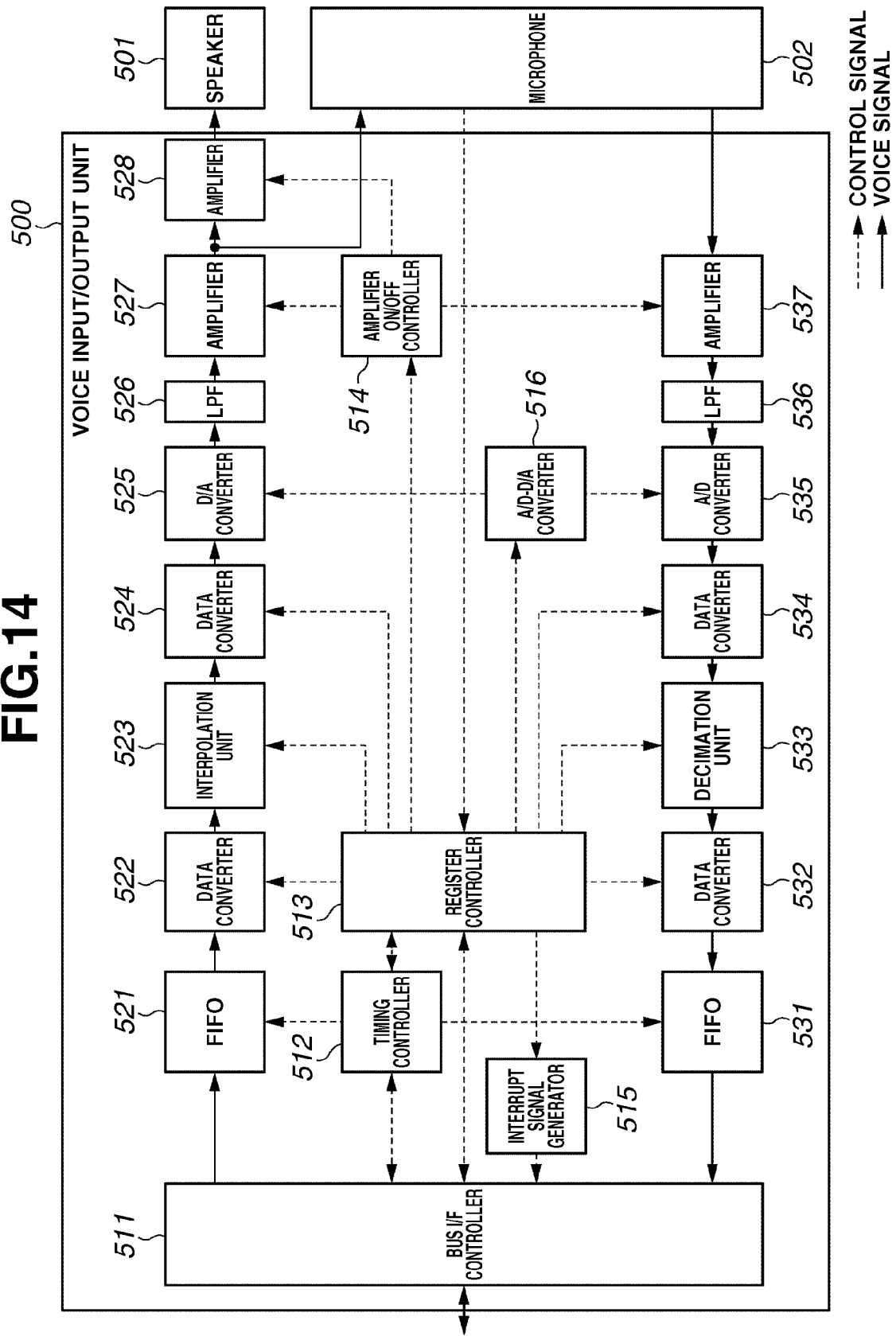
FIG. 14 is a block diagram showing a detailed configuration of the voice input/output unit according to the exemplary embodiment of the present invention.

FIG. 14 is a block diagram of a detailed configuration of the voice input/output unit 500 which is a feature of the present exemplary embodiment.

In FIG. 14, the voice input/output unit 500 has a circuit for outputting voice data inputted by the CPU 2001 through the system bus 2007, from the speaker 501 as voice, and a circuit for outputting voice data inputted from the microphone 502 to the voice recognition unit 2009 in the controller unit 30 through the system bus 2007.

The speaker 501 outputs the analog signal inputted from the amplifier 528 as voice. The microphone 502 outputs the voice-inputted analog signal to the amplifier 537. The bus interface (I/F) controller 511 mediates the exchange of voice data between the system bus 2007, and FIFO 521 and 531. For, example, the bus interface (I/F) controller 511 outputs a control signal to the timing controller 512 to set the timing of reading the data from the FIFO 521 and 531, and writing the data into the FIFO 521 and 531. In addition, the bus I/F controller 511 controls reading and writing from and to the various registers by the register controller 513, and also controls interrupting to the CPU 2001 based on the interrupt signal generated by the interrupt signal generator 515.

The timing controller 512 controls the timing of reading the data from the FIFO 531 and the timing of writing the data into the FIFO 521 according to the control signal outputted from the bus I/F controller 511, and according to the control register and the status register of the register controller 513. The addresses of the writing position and the reading position of the FIFO 521 and 531 are indicated in the counter register of the register controller 513. The timing controller 512 performs the count up control of this counter register.

The register controller 513 includes a bus I/F controller 511, a timing controller 512, an amplifier ON/OFF controller 514, an interrupt signal generator 515, an A/D-D/A controller 516, a data converters 522, 524, 532, and 534, and an interpolation unit 523. In addition, the register controller 513 includes a control register, a counter register, and a status register used in a decimation unit 533, and controls these registers. For example, the register controller 513 puts up a status register when the counter register indicating the writing position and the reading position of the FIFO 521 and 531, reaches the FIFO size. The register controller 513 also puts up a status register when the processing by the voice input/output unit 500 is completed.

The amplifier on/off controller 514 performs the on/off control of the amplifiers 527, 528 and 537 according to the control register of the register controller 513. This control register is controlled from the CPU 2001 through the bus I/F controller 511. Alternatively, the amplifier on/off controller 514 can control the amplifiers 527, 528 and 537 according to the status register indicating either on-hook or off-hook.

The interrupt signal generator 515 generates an interrupt signal when there is a change in the status of the status register in the register controller 513 and outputs an interrupt signal to the CPU 2001 through the bus I/F controller 511. For example, the interrupt signal is generated when the reading and writing of the FIFO 521, 531 are completed, or when the processing of the voice input/output unit 500 is completed. The A/D-D/A converter 516 changes the sampling frequency, performs the on-off control, and performs control to start conversion of the D/A converter 525 and the A/D converter 535 according to the control register of the register controller 513. This control register is controlled from the CPU 2001 through the bus I/F controller 511.

The FIFO 521 and 531 are buffer memories for the voice data and can take a double buffer configuration. The data converters 522, 524, 532 and 534 adjust the data width used in the interpolation unit 523 and the decimation unit 533 to be the same as the data width used in the FIFO 521 and 531, the D/A converter 525 and the A/D converter 535. The data converters 522, 524, 532 and 534 are unnecessary in the case where all the processes are performed with the same data width.

The interpolation unit 523 interpolates voice data in the case where the sampling frequency of the voice data is smaller than the D/A converter 525, and the data amount is small. The interpolation unit 523 changes the interpolation method according to the control register of the register controller 513. This control register is controlled from the CPU 2001 through the bus I/F controller 511. The D/A converter 525 converts digital signal to analog signal according to the sampling frequency set in the A/D-D/A controller 516. The LPF (Low Pass Filter) 526 and 536 cut off the high frequency component. The cut-off frequency of the LPF 526 is less than half of the sampling frequency of the D/A converter 525. The cut-off frequency of the LPF 536 is less than half of the sampling frequency of the A/D converter 535.

The amplifiers 527, 528 and 537 amplify the signal, and their on/off control is performed by the amplifier on/off controller 514. The decimation unit 533 decimates the voice data in the case where the sampling frequency is smaller than the A/D converter 535 and the data amount is small. The decimation unit 533 changes the decimation method according to the control register of the register controller 513. The A/D converter 535 converts analog signals to digital signals according to the sampling frequency set in the A/D-D/A converter 516.

It is presumed that a secure print job is inputted into the image forming apparatus 220 of the present exemplary embodiment from the PCs 212 and 213. An example in which secure print is performed by an input from the operating panel 140 will be described below with reference to FIGS. 4, 15, 16, and 17.

Since the secure print in the image forming apparatus 220 in the present exemplary embodiment is set in the hierarchy below the system status/cancel key 1033, the user first selects the system status/cancel key 1033 shown in FIG. 4.

Figure 15:
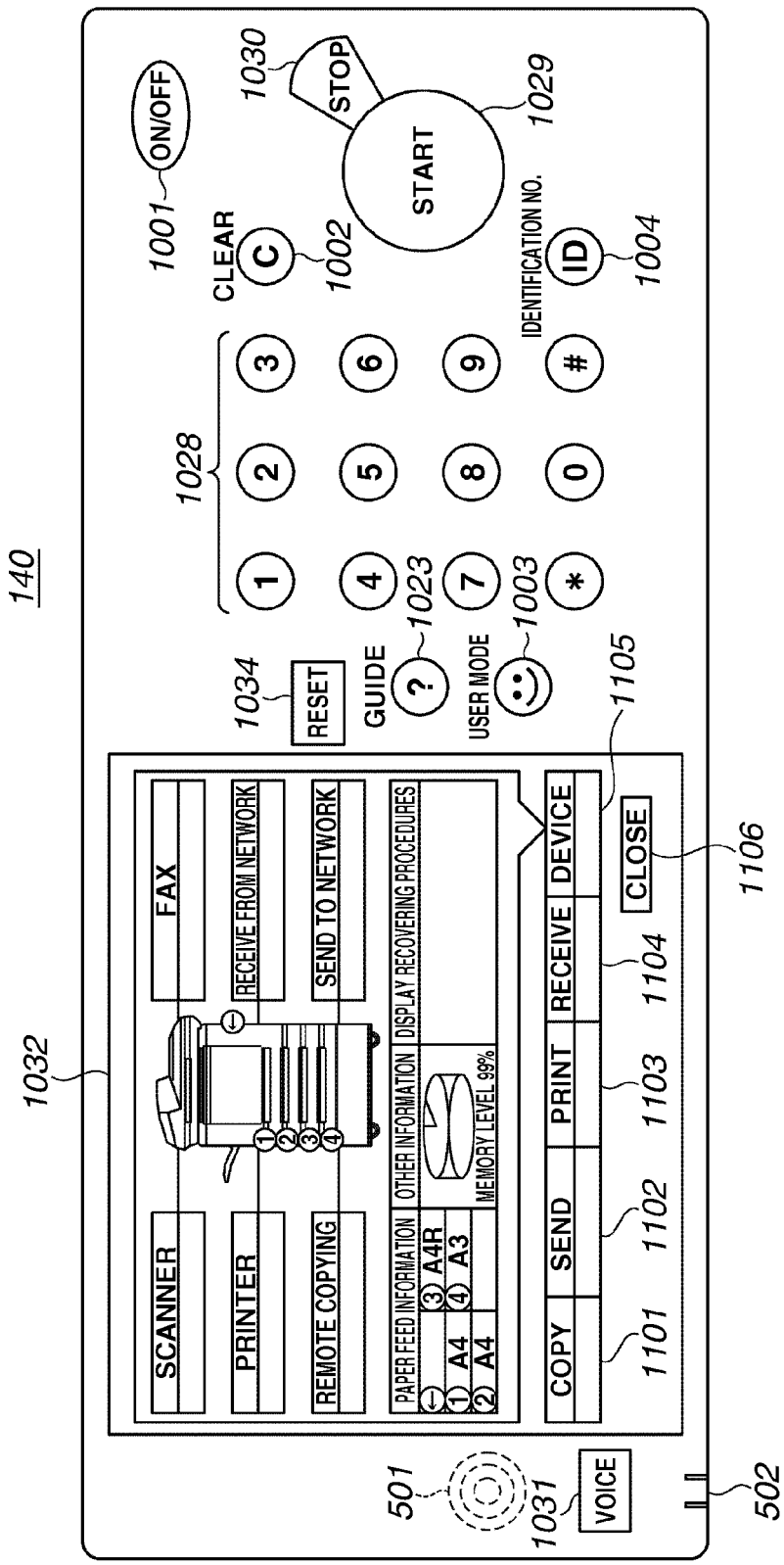
FIG. 15 is an example of the screen displayed on the LCD display unit of the operating panel after the system status/cancel key is depressed according to the exemplary embodiment of the present invention.

When the system status/cancel key 1033 is selected, the LCD display unit 1032 in the operating panel 140 switches to the screen shown in FIG. 15. In FIG. 15, the copy status/cancel key 1101 is used for confirming the status of the copy function. The transmission status/cancel key 1102 is used for confirming the status of the transmission function. The print status/cancel key 1103 is used for confirming the status of the print function.

The reception status/cancel key 1104 is for confirming the status of the reception function. The device status/cancel key 1105 is for confirming the status of the device function. The "close" key 1106 is used for going back to the display of the above hierarchy. If the user selects the "close" key 1106, the display returns to that shown in FIG. 4. Since the secure print is set in the hierarchy below the print status/cancel key 1103, the user selects the print status/cancel key 1103.

Figure 16:
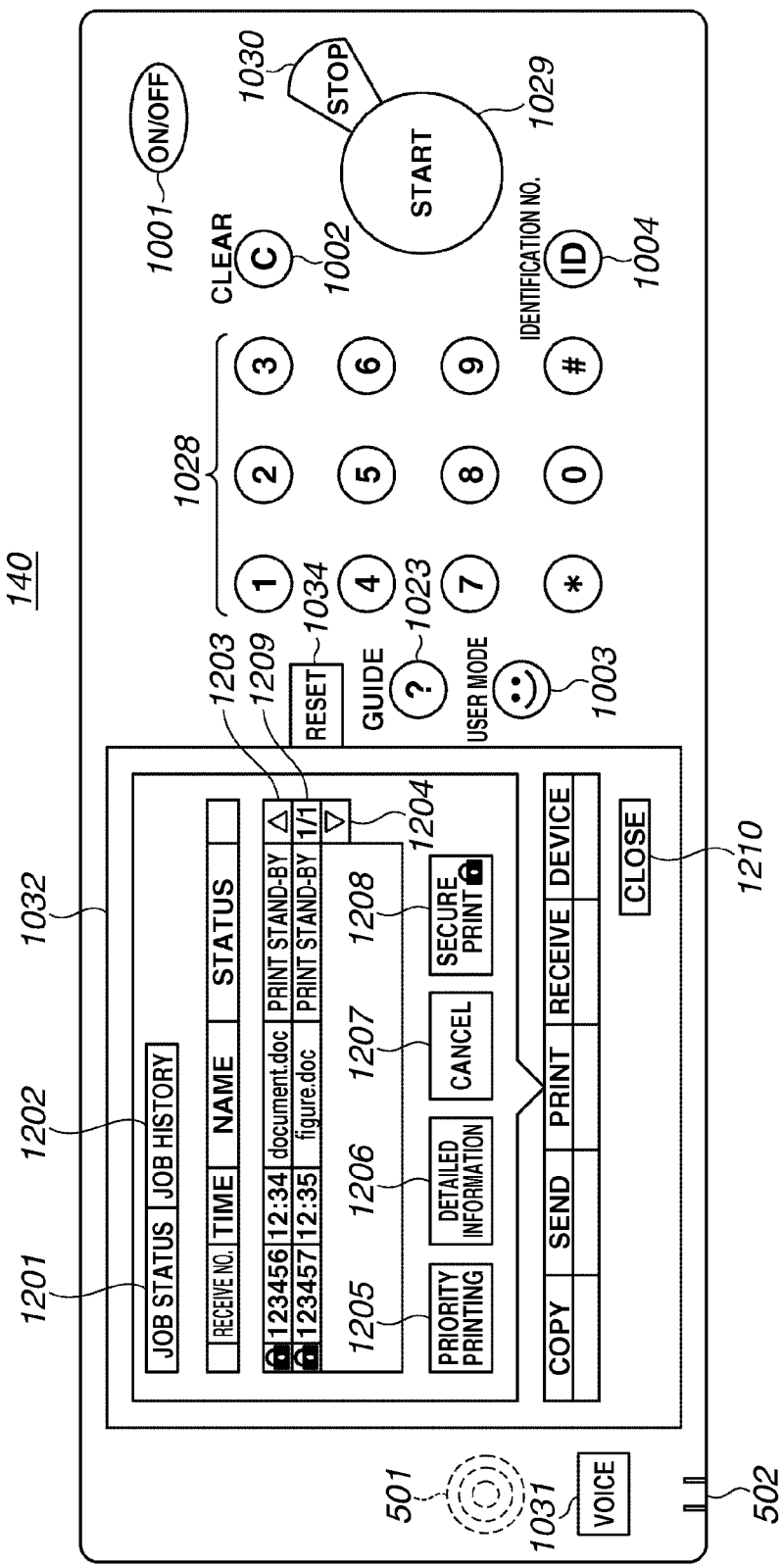
FIG. 16 is an example of the screen displayed on the LCD display unit of the operating panel after the print status/cancel key is depressed according to the exemplary embodiment of the present invention.

When the print status/cancel key 1103 is selected, the LCD display unit 1032 in the operating panel 140 switches to the screen shown in FIG. 16. In FIG. 16, the job status key 1201 is used for displaying the status of the job not executed. The job history key 1202 is used to display the job that is already executed. The page-up key 1203 and the page-down key 1204 are used when the user wants to change the page currently displayed to another page. The currently displayed page is displayed on the displayed page counter 1209.

The priority printing key 1205 is used for changing the priority of the selected job (i.e., the job "document.doc" in FIG. 16). Even in the case where a number of jobs are inputted, by selecting the priority printing key 1205, the selected job is executed as soon as the present print job ends. The detailed information key 1206 is used to gain detailed information on the selected job. The cancel key 1207 is for canceling the present job.

The secure print key 1208 is used for executing the selected secure print job. In the example shown in FIG. 16, there are two print jobs waiting, and the "lock" marks on the left side of the reference numbers indicate that both jobs are secure print jobs. The "close" key 1210 is used for returning to the display of the above hierarchy. By selecting the "close" key 1210, the display returns to that shown in FIG. 4.

Figure 17:
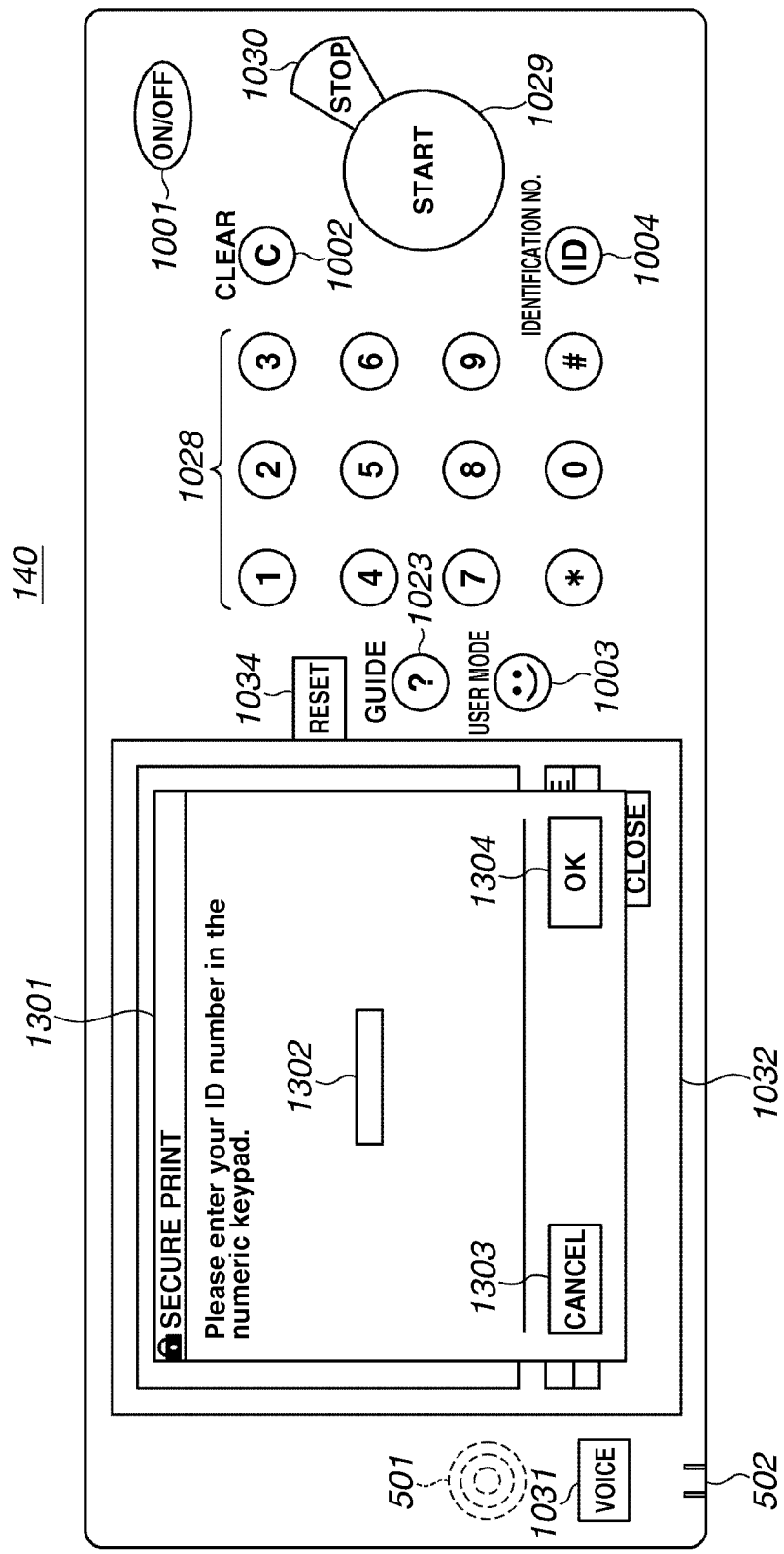
FIG. 17 is an example of the screen displayed on the LCD display unit of the operating panel after the secure print key is depressed according to the exemplary embodiment of the present invention.

In the case where the secure print key 1208 is selected for performing a job named "document.doc" by secure print, the pop-up menu 1301 for secure print is displayed as shown in FIG. 17. In the image forming apparatus 220 of the present exemplary embodiment, an identification number (hereinafter referred to as "password") is entered using a numeric keypad 1028. Accordingly, the password that the user set when inputting a secure print job from the PC 212 and 213 into the image forming apparatus 220 is entered using the numeric keypad 1028. The inputted password is displayed on the password display unit 1302 as "*" equal to the number of digits entered. The cancel button 1303 is used for canceling the inputted password. The OK button 1304 is used when the inputting of the password is completed and secure print is to be executed.

An example of the procedure for registering a password for performing secure print will be described below with reference to FIGS. 4, 18, and 19. The password is registered onto the voice input-prohibited information list 1703 using the operating panel 140. Since the process of registering onto the voice input-prohibited information list 1703 is set in the hierarchy below the user mode key 1003 in the image forming apparatus 220 of the present exemplary embodiment, the user selects the user mode key 1003 on the operating panel 140 as shown in FIG. 4.

Figure 18:
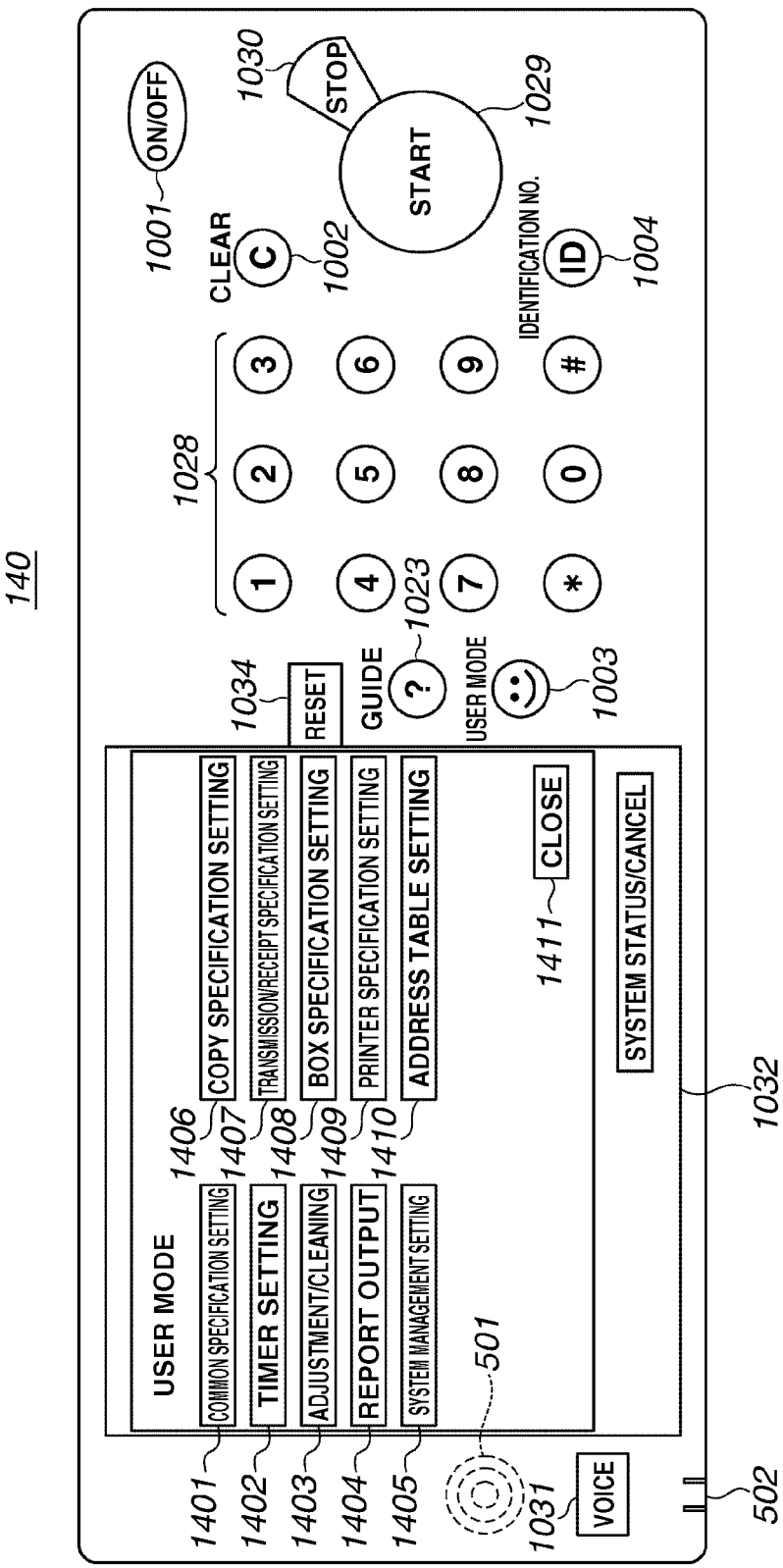
FIG. 18 is an example of the screen displayed on the LCD display unit of the operating panel after the user mode key is depressed according to the exemplary embodiment of the present invention.

When the user mode key 1003 is selected, the LCD display unit 1032 of the operating panel 140 switches to the screen shown in FIG. 18. In FIG. 18, the common specification setting key 1401 is used for setting the specifications that are common in the copy/box/send/fax functions. The timer setting key 1402 is used to adjust and set the time elapsed until the image forming apparatus 220 enters the sleep state. The adjustment/cleaning setting key 1403 is used to adjust zooming, correct image gradation and density, and set the cleaning.

The report output key 1404 is used for setting the printing conditions of the transmission result report and the communication management report, and for printing the address list and the settings of the user mode. The system management setting key 1405 is used for making settings of the entire system, such as system manager information, ID management by division, communication/network, and voice input-prohibited information list 1703. The copy specification setting key 1406 is used for making a setting so that the copy function becomes easy to use. The transmission/receipt specification setting key 1407 is used to register and change the initial settings of the transmission/receipt function according to the usage.

The box specification setting key 1408 is used for making a setting so that the box function becomes easy to use. The printer specification setting key 1409 is used for making a setting so that the printer becomes easy to use. The address table setting key 1410 is used for registering or changing the address list or the one-touch button. The "close" key 1411 is for going back to the display of the above hierarchy. When the "close" key 1411 is selected, the display returns to that shown in FIG. 4. Since the setting of the voice input-prohibited information list 1703 is made in the hierarchy below the system management setting key 1405, the user selects the system management setting key 1405.

Figure 19:
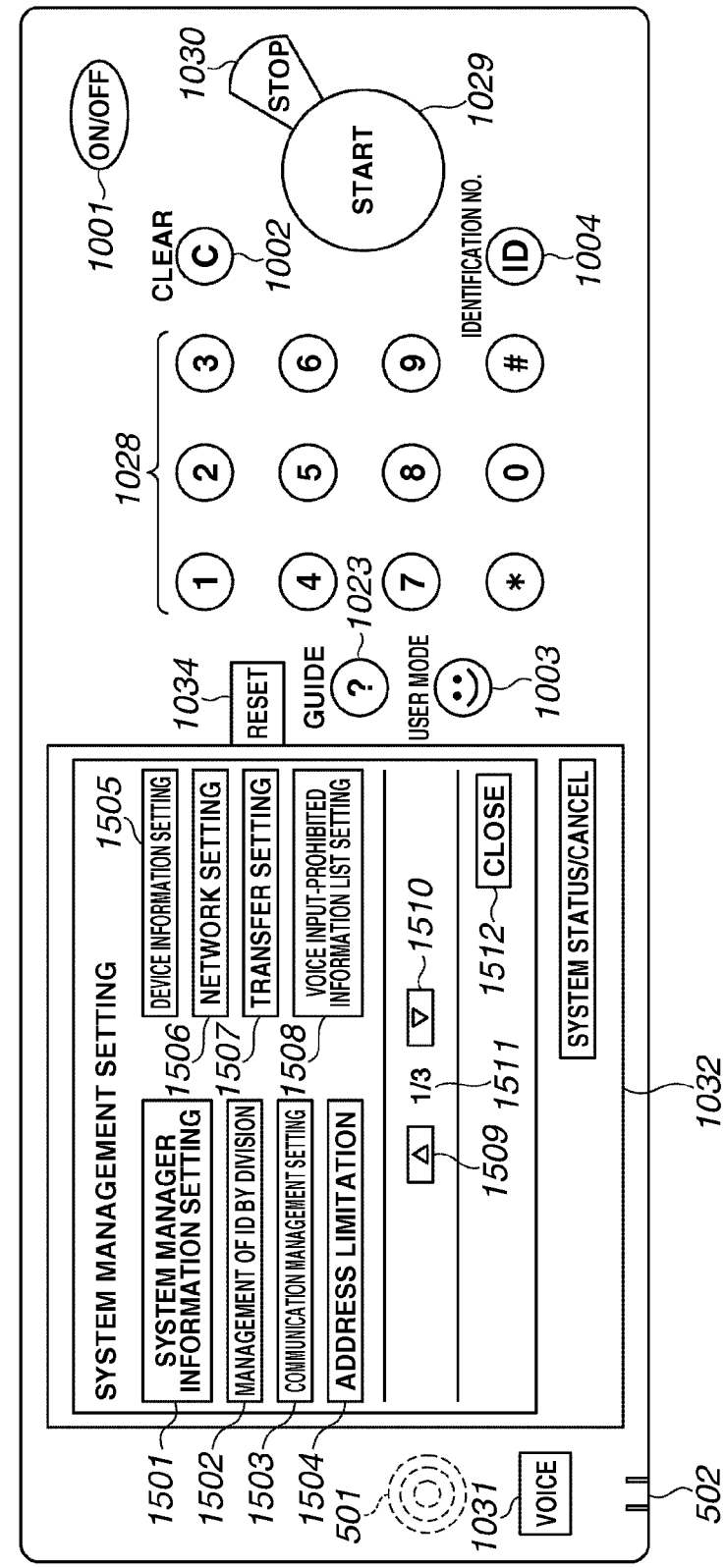
FIG. 19 is an example of the screen displayed on the LCD display unit of the operating panel after the system management setting key is depressed according to the exemplary embodiment of the present invention.

When the system management setting key 1405 is selected, the LCD display unit 1032 of the operating panel 140 switches to the screen shown in FIG. 19. In FIG. 19, the system manager information setting key 1501 is used for setting the system manager information in the image forming apparatus 220. The management of ID by division key 1502 includes the division ID and the password for each division ID. The management of ID by division key 1502 is used for making the image forming apparatus 220 usable only in the case where the password is inputted, and in confirming the copy/scan/print count of each division.

The communication management setting key 1503 is used for making a setting of e-mail transmission or the system box. The address limitation key 1504 is used for setting a password to the address list or setting access number management. The device information setting key 1505 is used for setting the name or the installation site of the image forming apparatus 220. The network setting key 1506 is used for connecting the image forming apparatus 220 to a network (i.e., LAN 2011).

The transfer setting key 1507 is used for setting the transfer condition, or registering, changing, and deleting the transfer address. The received document which satisfies the conditions set by the transfer setting key 1507 is transferred to the designated address. The voice input-prohibited information list setting key 1508 is used for registering and deleting information prohibited from inputting by voice while in the voice input mode. The page-up key 1509 and the page-down key 1510 are used to change the displayed page from the current page to another page in the case where there are many items to be displayed and not all of them can be displayed. The currently displayed page is displayed on the displayed page counter 1511.

The "close" key 1512 is used for going back to the display of the above hierarchy. When the "close" key 1512 is selected the display returns to that shown in FIG. 18. Since voice input-prohibited information list 1703 is set by the voice input-prohibited information list setting key 1508, the user selects the voice input-prohibited information list setting key 1508.

Figure 20:
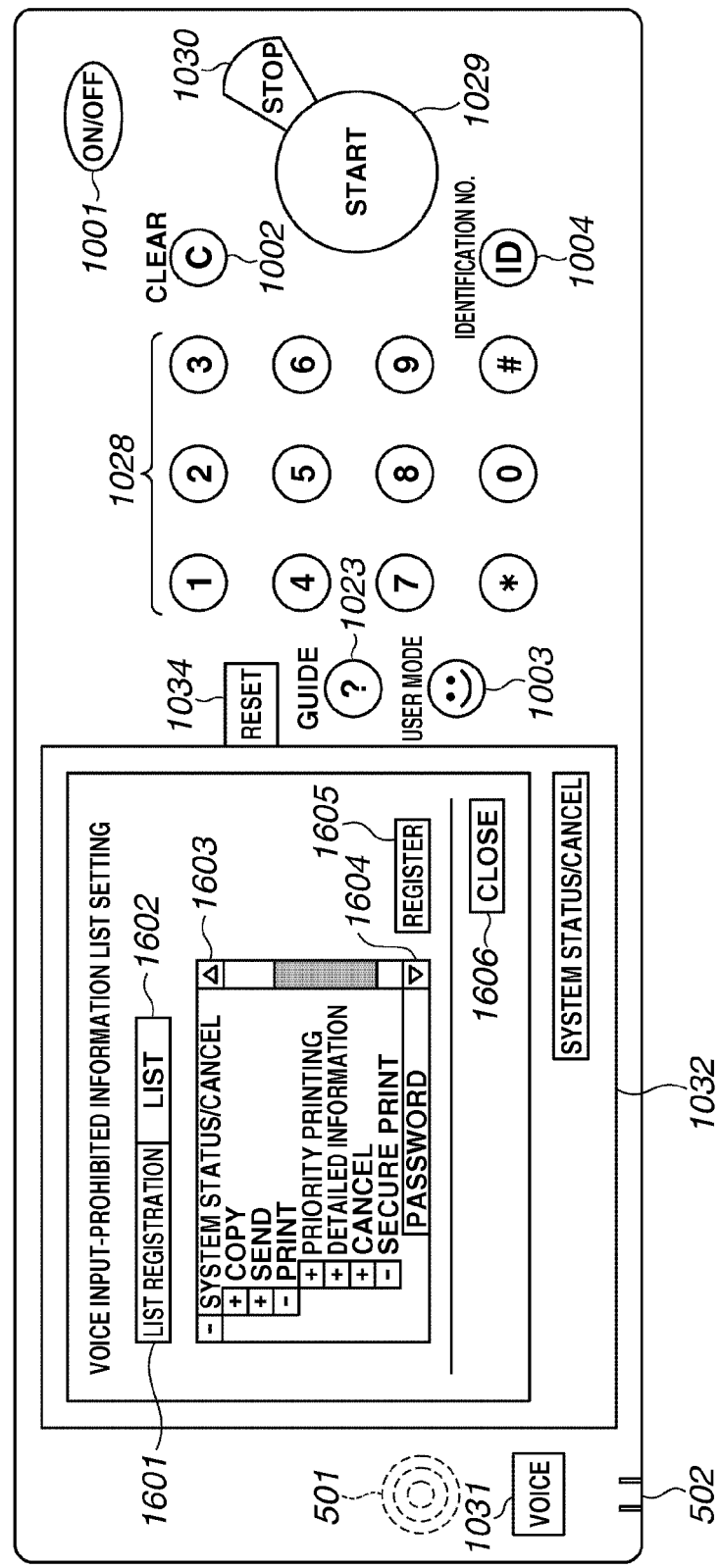
FIG. 20 is an example of the screen displayed on the LCD display unit of the operating panel after the key for setting the voice input-prohibited information list is depressed according to the exemplary embodiment of the present invention.

When the voice input-prohibited information list setting key 1508 is selected, the LCD display 1032 of the operating panel 140 switches to the screen shown in FIG. 20. In FIG. 20, the list registration key 1601 is used to display the information to be registered onto the voice input-prohibited information list 1703. The list key 1602 is used for displaying the information registered in the voice input-prohibited information list 1703. A plurality of voice input-prohibited information can be registered in the voice input-prohibited information list 1703.

The scroll-up key 1603 and scroll-down key 1604 are used to change the displayed page from the current page to another page when there are many items to be displayed and not all of them can be displayed. The registration key 1605 is used to register selected information in the voice input-prohibited information list 1703. The "close" key 1606 is used for going back to the display of the above hierarchy. When the "close" key 1606 is selected, the display returns to that shown in FIG. 19. In the example shown in FIG. 20, the password below the secure print group is selected which is below the print group below the system status/cancel group. When the registration key 1605 is selected, "system status/cancel\print\secure print\password" is added to the voice input-prohibited information list 1703.

Figure 21:
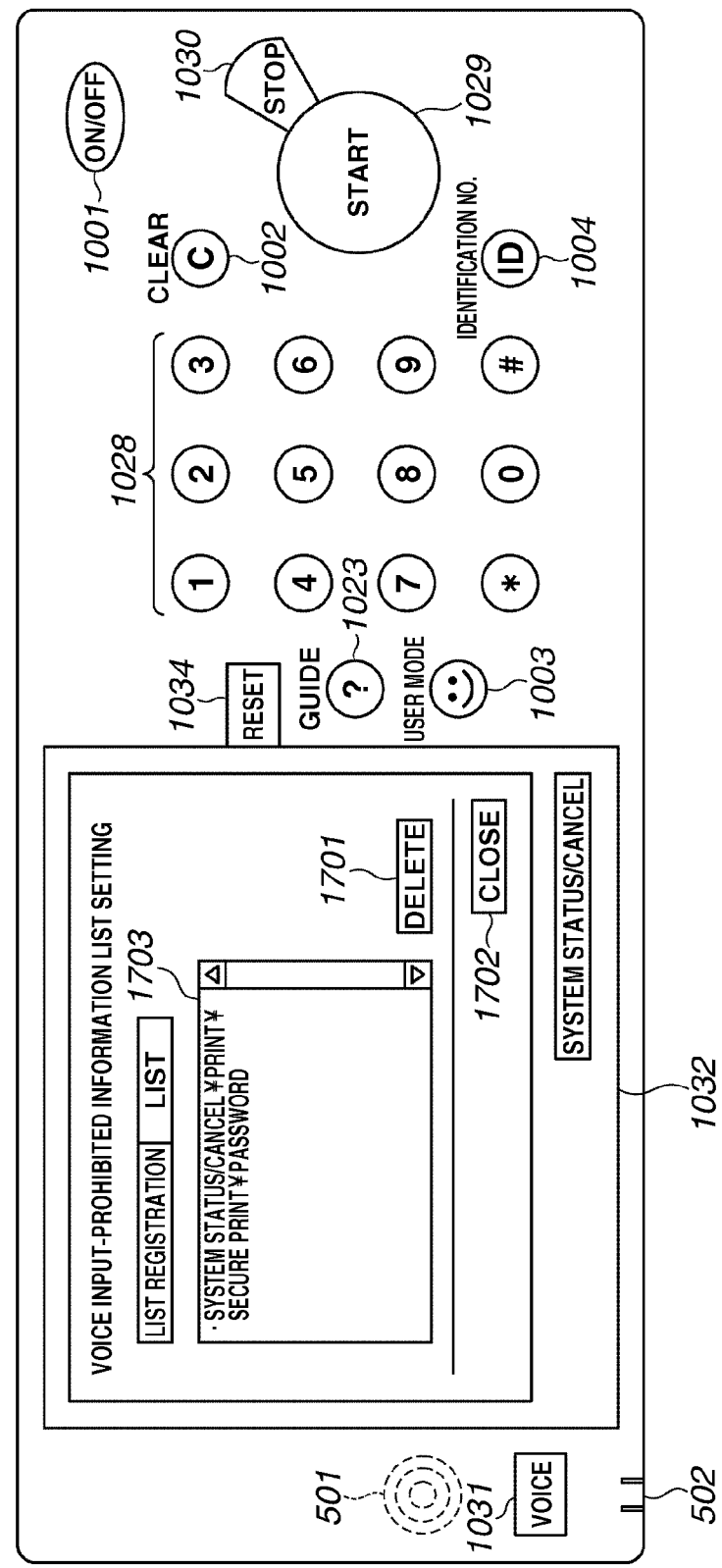
FIG. 21 is an example of the screen displayed on the LCD display unit of the operating panel after the list key is depressed according to the exemplary embodiment of the present invention.

When the list key 1602 is selected after the registration key 1605 is selected, the LCD display unit 1032 of the operating panel 140 switches to the screen as shown in FIG. 21. In FIG. 21, the delete key 1701 is used for deleting a selected item in the voice input-prohibited information list 1703. The "close" key 1702 is used for going back to the display of the above hierarchy. When the "close" key 1702 is selected in the state as shown in FIG. 21, the display returns to that shown in FIG. 20. In the example shown in FIG. 21, "system status/cancel\print\secure print\password" is registered onto the voice input-prohibited information list 1703. That is, a password below the secure print group is registered which is below the print group below the system status/cancel group.

An example of the operation of the image forming apparatus in the voice input mode will be described below by referring to the flowchart of FIG. 22.

When the voice key 1031 in FIG. 4 is selected by the user, the CPU 2001 shifts the operating mode to the voice input/output mode (step S1). The voice input/output unit 500 in FIG. 6 generates voice such as "please input the desired process by voice" from the speaker 501 providing guidance (step S2).

The voice input/output unit 500 waits until voice is inputted through the microphone 502 (step S3). When it is determined that voice is inputted (YES in step S3), the voice input/output unit 500 converts the voice into digital data which is then sent to the voice recognition unit 2009. The voice recognition unit 2009 converts the voice which has been converted to digital data to text data (step S4).

The CPU 2001 determines whether the voice converted to text data can be recognized (step S5). In the case where the CPU 2001 cannot determine the result recognized by the voice recognition unit 2009 because, for example, the voice is not clear (NO in step S5), the voice input/output unit 500 generates voice such as "The voice cannot be recognized. Please input voice again." from the speaker 501 providing guidance (step S19).

On the other hand, in the case where the voice converted to text data is recognized as described above (YES in step S5), the CPU 2001 creates an information list required for performing the process in accordance with the recognized voice (step S6). That is, a list of process candidates is created which can be performed after the process inputted by voice is performed. For example, in the case where "system status/cancel" is inputted by voice in step S3, the following information list is created: The process that can be instructed after the system status/cancel process is "copy", "send", or "print". Therefore, in the case where "system status/cancel" is inputted by voice, an information list which is "copy, send, print" is created. Alternatively, for example, in the case where "secure print" is inputted by voice in step S3, an information list which is "priority print, detailed information, cancel, secure print" is created.

The CPU 2001 then selects the unprocessed information from the information list created in step S6 (step S7). For example, in the case where the information list is "copy, send, print", "copy" that is unprocessed information is thus selected. Then, it is determined whether the selected information is registered on the voice input-prohibited information list 1703 (step S8). More specifically, it is determined whether the information indicating the path to the selected information, such as "system status/cancel\copy" or "system status/cancel \print\detailed information" is registered on the voice input-prohibited information list 1703.

In the case where the selected unprocessed information is not registered in the voice input-prohibited information list 1703 (NO in step S8), the voice input/output unit 500 generates voice such as "please input (selected information by) voice" from the speaker 501 providing guidance (step S13).

When the user inputs voice through the microphone 502, the voice input/output unit 500 converts the inputted voice to digital data, which is then sent to the voice recognition unit 2009 (step S14). If a given time elapses without voice input (NO in step S14), the process proceeds to step S17.

The voice recognition unit 2009 converts the voice which has been converted to digital data into text data (step S15). Then, the CPU 2001 determines whether the voice converted to text data can be recognized (step S16). If the CPU 2001 cannot determine the result recognized by the voice recognition unit 2009 due to obscurity in voice (NO in step S16), the voice input/output unit 500 generates voice such as "The voice cannot be recognized. Please input voice again." from the speaker 501 providing guidance (step S20).

On the other hand, in the case where the voice converted to text data is recognized as described above (YES in step S16), the CPU 2001 determines whether all of the information on the information list created in step S6 has been selected (S17). As a result, if there is information that has not been selected (NO in step S17), the process returns to step S7.

In step S8 described above, in the case where the selected unprocessed information is registered in the voice input-prohibited information list 1703 (YES in step S8), the voice input/output unit 500 generates voice such as "please input (the selected information) from the operating panel" from the speaker 501 providing guidance to the user (step S9). In the case where a password is selected in step S7, voice such as "please input the password from the operating panel" is generated since this password is registered in the voice input-prohibited information list 1703 as shown in FIG. 20.

The CPU 2001 then switches the operating mode from the voice input mode to the operating panel input mode (step S10). At this time, a screen as shown in FIG. 17 is displayed on the operating panel 140. The CPU 2001 waits until the information is correctly inputted via the operating panel 140. If input is not made in a given amount of time (NO in step Sli), the process proceeds to step S17.

When the information is correctly inputted via the operating panel 140, the CPU 2001 switches the operating mode from the operating panel input mode back to the voice input mode (step S12).

As described above, the CPU 2001 then determines whether all of the information in the information list created in step S6 has been selected (step S17). When it is determined that all of the information has been selected (YES in step S17), the process proceeds to step S21.

In step S21, it is determined whether the information list created in step S6 is a list corresponding to the final hierarchy. For example, in FIG. 20, the "copy, send, print" is not the final hierarchy since there is a process that should be performed after "print" In addition, the "priority print, detailed information, cancel, secure print" is not the final hierarchy since there is a process that should be performed after "secure print". On the other hand, the "password, job name (not shown)" is a final hierarchy.

As a result of the determination, if the list does not correspond to the final hierarchy (NO in step S21), the process returns to step S6 to create an information list corresponding to the subsequent hierarchy. Then, the subsequent steps repeat themselves. On the other hand, if it is determined that the list corresponds to the final hierarchy in step S21, the process proceeds to step S18 and performs processing according to the instruction inputted by voice or from the operating panel 140.

Figure 22:
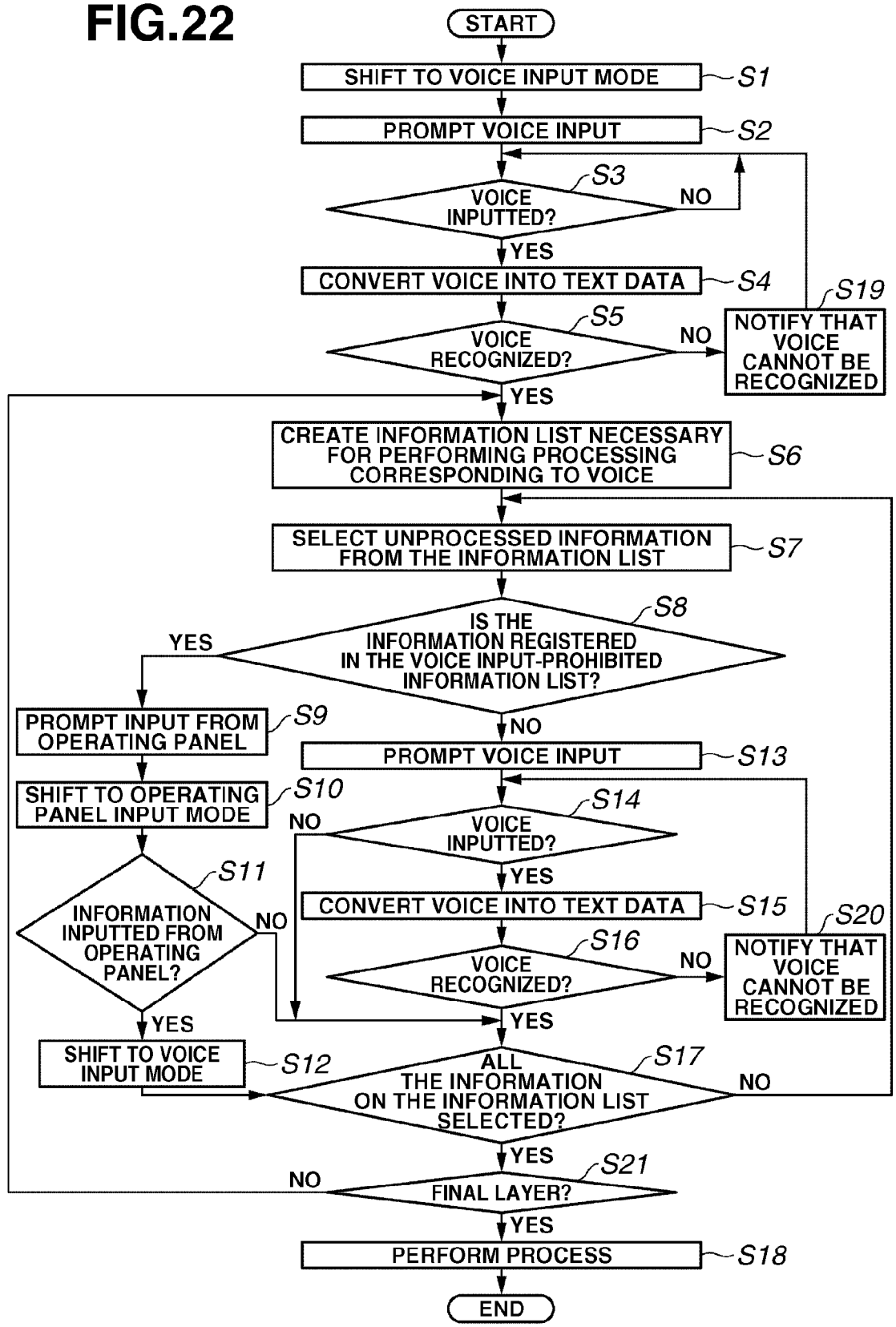
FIG. 22 is a flowchart describing an operation of the image forming apparatus in which secure print is performed in the voice input mode according to the exemplary embodiment of the present invention.

An exemplary operation of the image forming apparatus 220 as shown in the flowchart of FIG. 22 will now be described using a case where the required information for performing secure print is job name and password.

As described above, when the operating mode switches to a voice input/output mode, voice such as "please input the desired processing by voice" is generated from the speaker 501 (steps S1, S2). If the user then speaks "secure print" to the microphone 502, the voice input/output unit 500 judges that voice is inputted (step S3).

The inputted voice is converted to digital data and then to text data (step S4). The CPU 2001 recognizes that the voice converted to text data is an instruction of "secure print" and creates an information list based on the process to be inputted subsequent to "secure print" (step S5, S6). As described above, since the required information for executing secure print (or the information that should be inputted after secure print) is job name and password, the information list becomes "job name, password".

Next, the CPU 2001 determines whether "job name" in the created information list is registered on the voice input-prohibited information list 1703 (steps S7, S8). As shown in FIG. 20, since "job name" of secure print is not registered in the voice input-prohibited information list 1703 in FIG. 21, voice such as "please input job name by voice" is generated (step S13).

After the user speaks "document.doc" as the job name to the microphone 502, the voice input/output unit 500 judges that voice is inputted (step S14). Such inputted voice is converted to digital data and then to text data (step S15). The CPU 2001 recognizes that the voice converted to text data is a job name "document.doc" (step S16).

The CPU 2001 then determines whether all of the items in the information list "job name, password" have been selected. In this case, since "password" is not yet selected, the process returns to step S7, and the CPU 2001 determines whether "password" is registered in the voice input-prohibited information list 1703 (step S7, S8). As shown in FIG. 20, "password" of secure print (or "system status/cancel\print\secure print\password") is registered in the voice input-prohibited information list 1703. Therefore, the voice input/output unit 500 generates voice such as "please input password from the operating panel" (step S9).

The operating mode then shifts from the voice input mode to the operating panel input mode, and a screen as shown in FIG. 17 is displayed (step S10). When the correct password is inputted by operating on the numeric keypad 1028 and the OK key 1304 is selected, the operating mode shifts from the operating panel input mode back to the voice input mode (steps S11, s12).

Since "job name" and "password" required for executing "secure print" are inputted by the above steps, secure print is executed, and the process ends (step S17, S18).

In the present exemplary embodiment as described above, in the case where it is determined that inputted voice is registered in the voice input-prohibited information list 1703, the operating mode shifts to an operating panel input mode during a voice input mode in which a process is performed based on voice inputted through a microphone. In addition, the user is guided to input from the operating panel 140 (or the numeric keypad 1028). On the other hand, in the case where it is determined that inputted voice is not registered in the voice input-prohibited information list 1703, the user is guided to input by voice. That is, information that needs to be kept confidential such as a password, is inputted using the operating panel 140 so as to be not heard by others, and information that is not required to be kept confidential, such as a file name, is inputted simply by voice. As a result, instructions can be simply inputted via voice while confidential information, such as a password, can be protected.

In switching from the voice input mode to the operating panel input mode, voice guidance is given so that a user can be prevented from accidentally inputting confidential information by. When the voice input is possible, in the image forming apparatus 220, not only the voice input but the input from the operating panel 140 may be made to be accepted.

Other Exemplary Embodiments

In order to operate the various devices to realize the above described exemplary embodiment, a software program code for realizing such operations can be supplied to the apparatus connected to such various devices or to computers within the system. A configuration is also included in the scope of the present invention in which the various devices operate according to the program stored in the computer (CPU or MPU) of the system or the apparatus.

Additionally, in the above case, the software program code itself realizes the operations of the exemplary embodiment, and the program code itself constitutes the present invention. Moreover, a means for supplying the program code to a computer, for example a recording medium that stores the program code, constitutes the present invention. Such recording medium can be, for example, a floppy disk, hard disk, optical disk, magnetic optical disk, CD-ROM, magnetic tape, non-volatile memory card, or ROM.

Furthermore, in the case where the program code supplied to the computer realizes the operations of the above exemplary embodiment in collaboration with an operating system (OS) or other application software running on the computer, such program code is considered to be an exemplary embodiment of the present invention.

Furthermore, in the case where the supplied program code is stored in the memory equipped in a function enhancement board of the computer or a function enhancement unit connected to the computer, and the CPU in the function enhancement board or the function enhancement unit executes all or part of the processing based on the instructions of the program code to realize the operations of the exemplary embodiment, the program code is included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-265905 filed Sep. 13, 2005, which is hereby incorporated by reference herein in its entirety.

What is claimed is:

1. An apparatus for executing a job including a plurality of processes comprising:
    a voice input unit configured to input voice in a voice input mode, the voice input mode being that, for causing the apparatus to execute a job, a specifying of a process included in the job and a specifying of a parameter relating to the specified process are performed by inputting of a voice;
    an operating unit configured to operate in an operating panel input mode, the operating panel input mode being that, for causing the apparatus to execute a job, a specifying of a process included in the job and a specifying of a parameter relating to the specified process are performed by inputting from an operating panel;
    a registering unit configured to register at least one of the plurality of processes as voice input-prohibited information;
    a determination unit configured to determine whether a process, which is specified by the voice input unit when the apparatus is in the voice input mode, corresponds to the voice input-prohibited information registered by the registering unit;
    a switching unit configured to, in a case where the determination unit determines that the specified process corresponds to the registered voice input-prohibited information, switch a mode from the voice input mode to the operating panel input mode in order to specify a parameter relating to the process, and automatically switch the mode from the operating panel input mode to the voice input mode in order to specify a next process after the parameter is specified by the operating unit; and
    a job execution unit configured to execute a job, in accordance with specifying of a plurality of processes and parameters relating to the processes by using the voice input unit and the operating unit.

2. The apparatus according to claim 1, further comprising an informing unit configured to provide voice guidance to prompting operation on the operating unit in a case where the determination unit determines that the specified process corresponds to the registered voice input-prohibited information.

3. The apparatus according to claim 1, wherein the job execution unit executes a job for forming image data according to one of the inputted voice and an operation of the operating unit.

4. The apparatus according to claim 1, further comprising:
    a reading unit configured to read an original document; and
    a printing unit configured to perform printing based on the original document.

5. The apparatus according to claim 1, wherein the specified process is a password-input process, and wherein the parameter relating to the specified process is a password.

6. A method for executing a job including a plurality of processes for an apparatus comprising:
    inputting voice in a voice input mode, the voice input mode being that, for causing the apparatus to execute a job, a specifying of a process included in the job and a specifying of a parameter relating to the specified process are performed by inputting of a voice;
    inputting content associated with an operation in an operating panel input mode on an operating unit, the operating panel input mode being that, for causing the apparatus to execute a job, a specifying of a process included in the job and a specifying of a parameter relating to the specified process are performed by inputting from an operating panel;
    registering at least one of the plurality of processes as voice input-prohibited information;
    determining whether a process, which is specified by the voice input unit when the apparatus is in the voice input mode, corresponds to the voice input-prohibited information; and
    switching, in a case where the determining determines that the specified process corresponds to the registered voice input-prohibited information, mode from the voice input mode to the operating panel input mode in order to specify a parameter relating to the process, and automatically switching the mode from the operating panel input mode to the voice input mode in order to specify a next process after the parameter is specified.

7. A non-transitory computer-readable medium storing the computer-executable program of instructions for causing a computer to perform the method according to claim 6.

8. The non-transitory computer-readable medium according to claim 7, wherein the process is a password-input process, and wherein the parameter relating to the process is a password.

9. The non-transitory computer-readable medium according to claim 7, further comprising providing voice guidance prompting operation in a case where it is determined that the specified process corresponds to the registered voice input-prohibited information.

10. The non-transitory computer-readable medium according to claim 7, wherein a process for forming image data is performed according to one of the inputted voice and an operation of the operating unit.

11. The non-transitory computer-readable medium method according to claim 7, further comprising:
    reading an original document;
    and printing based on the original document.

12. The method according to claim 6, further comprising providing voice guidance prompting operation in a case where the determining determines that specified process corresponds to the registered voice input-prohibited information.

13. The method according to claim 6, wherein a process to execute a job for forming image data is performed according to one of the inputted voice and an operation of the operating unit.

14. The method according to claim 6, further comprising:
    reading an original document; and
    printing based on the original document.

15. Computer-executable process steps for causing a computer to execute the method of claim 6.

16. The method according to claim 6, wherein the process is a password-input process, and wherein the parameter relating to the process is a password.

* * * * *